US012768688B2

(12) United States Patent
Hansen et al.

(10) Patent No.: US 12,768,688 B2
(45) Date of Patent: Oct. 20, 2026

(54) ENVIRONMENTAL MONITORING SYSTEM AND METHOD FOR REAL TIME MONITORING OF ENVIRONMENTAL PARAMETERS IN A STRUCTURE

(71) Applicant: The Boeing Company, Arlington, VA (US)

(72) Inventors: Jeffrey M. Hansen, Moses Lake, WA (US); Joshua R. Burch, Moses Lake, WA (US); Brenda B. Nolan, Tacoma, WA (US)

(73) Assignee: The Boeing Company, Arlington, VA (US)

( * ) Notice: Subject to any disclaimer, the term of this patent is extended or adjusted under 35 U.S.C. 154(b) by 695 days.

(21) Appl. No.: 18/175,469

(22) Filed: Feb. 27, 2023

(65) Prior Publication Data

US 2024/0288288 A1 Aug. 29, 2024

(51) Int. Cl.

| | |
|---|---|
| ***G01D 21/02*** | (2006.01) |
| ***B64F 5/60*** | (2017.01) |
| ***G01S 19/01*** | (2010.01) |

(52) U.S. Cl.

CPC ............... *G01D 21/02* (2013.01); *B64F 5/60* (2017.01); *G01S 19/01* (2013.01); *G01D 2207/30* (2021.05)

(58) Field of Classification Search

CPC ...... G01D 21/02; G01D 2207/30; G01D 1/00; G01D 5/00; G01S 19/01; B64F 5/20; B64F 5/60; B64F 5/00; B64F 5/10

See application file for complete search history.

(56) References Cited

U.S. PATENT DOCUMENTS

| | | | | |
|---|---|---|---|---|
| 7,598,858 B2 * | 10/2009 | Quist | ..................... | G08B 25/08 340/539.22 |
| 11,465,755 B1 * | 10/2022 | Duran | ................ | G01N 33/0036 |
| 2007/0267546 A1 * | 11/2007 | Shah | ...................... | B64D 15/20 340/580 |

(Continued)

FOREIGN PATENT DOCUMENTS

| | | |
|---|---|---|
| CN | 205192526 U * | 4/2016 |

*Primary Examiner* — Catherine T. Rastovski
*Assistant Examiner* — Sharad Timilsina

(57) ABSTRACT

There is provided a method for real time monitoring of environmental parameter(s) in an interior of a structure. The method includes providing an environmental monitoring system with a microprocessor system, one or more sensors, a power supply, and a visual feedback display assembly. The method includes installing the sensor(s) in the interior of the structure, and collecting, with the sensor(s), environmental data relating to the environmental parameter(s) of the interior of the structure, to obtain collected environmental data. The method includes processing the collected environmental data, and comparing, with the microprocessor system, the processed environmental data to one or more predetermined values, to obtain environmental data results. The method includes alerting, with the visual feedback display assembly, one or more visual signals corresponding to one or more of, in-specification environmental parameter(s) of the interior of the structure, and out-of-specification environmental parameter(s), of the interior of the structure.

20 Claims, 15 Drawing Sheets

(56) References Cited

U.S. PATENT DOCUMENTS

| | | | | |
|---|---|---|---|---|
| 2015/0321768 | A1* | 11/2015 | Kumar | G08B 13/19673 340/870.07 |
| 2016/0176528 | A1* | 6/2016 | Meis | B60H 1/00821 701/36 |
| 2019/0259255 | A1* | 8/2019 | Nowzari | G08B 25/10 |
| 2020/0408429 | A1* | 12/2020 | Roen | C02F 1/008 |
| 2021/0291727 | A1* | 9/2021 | Edquist | B60Q 3/46 |
| 2021/0321675 | A1* | 10/2021 | Zhu | A24F 40/57 |
| 2021/0372650 | A1* | 12/2021 | Hyde | F24F 11/39 |
| 2022/0374797 | A1* | 11/2022 | Kalinski | G06Q 10/0635 |

* cited by examiner

ENVIRONMENTAL MONITORING SYSTEM AND METHOD FOR REAL TIME MONITORING OF ENVIRONMENTAL PARAMETERS IN A STRUCTURE

FIELD

The present disclosure relates generally to environmental monitoring systems and methods, and more particularly, to environmental monitoring systems and methods for real time monitoring of environmental parameters or conditions in an interior of a structure, such as an aircraft.

BACKGROUND

Environmental monitoring systems and methods may be used to monitor environmental parameters or conditions in an interior of a structure, such as an aircraft or other vehicle, a building, or other structures. For aircraft that are on the ground at a location for longer than a week, for example, in short term storage or long term storage, environmental parameters or conditions, such as temperature and humidity, in an interior of the aircraft, need to be monitored to avoid problematic issues. In cold weather conditions, the interior of the aircraft may be subject to low temperatures and/or high humidity, for example, if a heater or a duct used to pump heated air into the interior malfunctions, which may result in frozen plumbing or other interior structures, and/or condensation and mildew formation. In addition, in warm weather conditions, the interior of the aircraft may be subject to high temperatures and/or high humidity, for example, if a cold air fan used to pump cooled air into the interior malfunctions, which may result in cracking or warping of interior surfaces and structures and/or condensation and mildew formation.

One known environmental monitoring system and method in the form of a data logger system exists for monitoring the temperature of an interior of a sealed aircraft that is in long term storage or short term storage. Such data logger system is positioned in the interior of the sealed aircraft and collects temperature data for the interior of the sealed aircraft. Typically, on a weekly basis, one or more human users enter the sealed aircraft by breaking the seals and downloading the collected temperature data from the data logger system onto a USB (universal serial bus) stick or other computer readable storage device. The one or more human users must then reseal the aircraft before leaving. Such known data logger system does not provide a real time feedback of the temperature monitoring of the interior of the aircraft. This may result in discovering issues have occurred to the interior of the aircraft after the fact and before corrective action may be taken. Moreover, the use of such known data logger system requires unsealing and resealing of the aircraft each time the temperature data is collected, and this may be time consuming and labor intensive.

In addition, one known environmental monitoring system and method in the form of a humidity indicator card exists for monitoring the humidity of an interior of a sealed aircraft that is in long term storage or short term storage. Several of such humidity indicator cards are positioned at various locations in the interior of the aircraft to monitor humidity. Each humidity indicator card has chemically impregnated color-change indicators that change color from blue to pink if the humidity in the atmosphere reaches an unacceptably high level. Typically, on a weekly basis, one or more human users enter the sealed aircraft by breaking the seals and checking the humidity indicator cards to see if the colors have changed from blue to pink. The one or more human users must then reseal the aircraft before leaving. Such known humidity indicator cards do not provide a real time feedback of the humidity monitoring of the interior of the aircraft. This may result in discovering issues have occurred to the interior of the aircraft after the fact and before corrective action may be taken. Moreover, the use of such known humidity indicator cards requires unsealing and resealing of the aircraft each time the humidity indicator cards are checked, and this may be time consuming and labor intensive.

Moreover, dew point is another environmental parameter that would be advantageous to monitor in real time in an interior of a structure, such as an aircraft, a building, or another structure, to keep the moisture under control. The dew point is the temperature to which air must be cooled to become saturated with water vapor, assuming constant air pressure and water content. When cooled below the dew point, moisture capacity is reduced and airborne water vapor will condense to form liquid water known as dew. The dew point is affected by humidity, and when there is more moisture in the air, the dew point is higher. The dew point may be calculated based on the temperature of the air and the humidity or relative humidity.

Accordingly, there is a need in the art for an improved environmental monitoring system and method for real time monitoring of environmental parameters, such as temperature, humidity, and dew point, in a structure, such as an aircraft, where such environmental parameters may be easily monitored from an exterior of the structure, and where such system and method are simple to make and use, save time and labor, and provide advantages over known environmental monitoring systems and methods.

SUMMARY

Example implementations of the present disclosure provide an improved environmental monitoring system and method for monitoring environmental parameters in a structure, such as an aircraft. As discussed in the below detailed description, versions of the improved environmental monitoring system and method may provide significant advantages over known environmental monitoring systems and methods.

In a version of the disclosure, there is provided an environmental monitoring method for real time monitoring of one or more environmental parameters in an interior of a structure. The environmental monitoring method comprises the step of providing an environmental monitoring system. The environmental monitoring system comprises a microprocessor system, one or more sensors connected to the microprocessor system, a power supply coupled to the microprocessor system, and a visual feedback display assembly coupled to the microprocessor system.

The environmental monitoring method further comprises the step of installing the one or more sensors of the environmental monitoring system in the interior of the structure. The environmental monitoring method further comprises the step of collecting, with the one or more sensors, environmental data relating to one or more environmental parameters of the interior of the structure, to obtain collected environmental data.

The environmental monitoring method further comprises the step of processing, with the microprocessor system of the environmental monitoring system, the collected environmental data, to obtain processed environmental data, and comparing, with the microprocessor system, the processed environmental data to one or more predetermined values, to obtain environmental data results. The environmental monitoring method further comprises the step of alerting, with the visual feedback display assembly, one or more visual signals corresponding to one or more of, one or more in-specification environmental parameters of the interior of the structure, and one or more out-of-specification environmental parameters of the interior of the structure.

In another version of the disclosure, there is provided an environmental monitoring method for real time monitoring of one or more environmental parameters in an interior of an aircraft. The environmental monitoring method comprises the step of providing an environmental monitoring system. The environmental monitoring system comprises a microprocessor system, one or more sensors connected to the microprocessor system, a power supply coupled to the microprocessor system, and a multicolor light feedback display assembly coupled to the microprocessor system.

The environmental monitoring method further comprises the step of installing the one or more sensors of the environmental monitoring system in the interior of the aircraft. The environmental monitoring method further comprises the step of collecting, with the one or more sensors, environmental data relating to one or more environmental parameters of the interior of the aircraft, to obtain collected environmental data. The one or more environmental parameters comprise one or more of, a temperature of the interior of the aircraft, a humidity of the interior of the aircraft, and a dew point of the interior of the aircraft based on the temperature and the humidity.

The environmental monitoring method further comprises the step of processing, with the microprocessor system of the environmental monitoring system, the collected environmental data, to obtain processed environmental data, and comparing, with the microprocessor system, the processed environmental data to one or more predetermined values, to obtain environmental data results. The environmental monitoring method further comprises the step of alerting, with the multicolor light feedback display assembly, one or more light emitting diode (LED) color signal lights corresponding to one or more of, one or more in-specification environmental parameters of the interior of the aircraft, and one or more out-of-specification environmental parameters of the interior of the aircraft.

In another version of the disclosure, there is provided an environmental monitoring system for real time monitoring of one or more environmental parameters in an interior of a structure. The environmental monitoring system comprises one or more sensors positioned in the interior of the structure. The one or more sensors are configured to collect environmental data relating to the one or more environmental parameters of the interior of the structure, to obtain collected environmental data.

The environmental monitoring system further comprises a microprocessor system connected to the one or more sensors. The microprocessor system is configured to process the collected environmental data, to obtain processed environmental data, and the microprocessor system is configured to compare the processed environmental data to one or more predetermined values, to obtain environmental data results.

The environmental monitoring system further comprises a power supply coupled to the microprocessor system. The environmental monitoring system further comprises a visual feedback display assembly coupled to the microprocessor system. The visual feedback display assembly is configured to provide an alert using one or more visual signals corresponding to one or more of, one or more in-specification environmental parameters of the interior of the structure, and one or more out-of-specification environmental parameters of the interior of the structure.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

Figure 1:
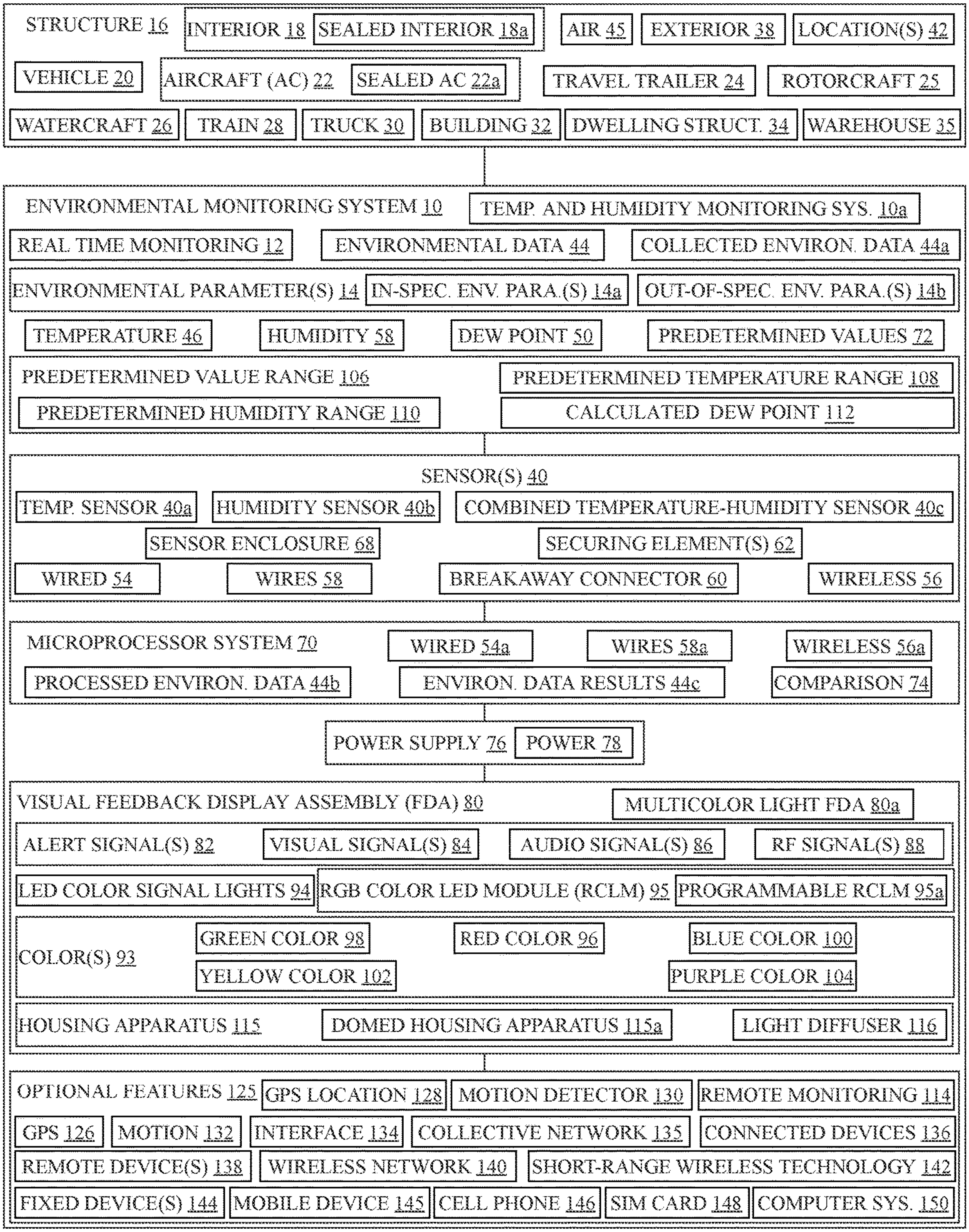
FIG. 1 is an illustration of a block diagram of an exemplary version of an environmental monitoring system of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a block diagram of an exemplary version of an environmental monitoring system 10, for example, a temperature and humidity monitoring system 10*a*, of the disclosure. As shown in FIG. 1, the environmental monitoring system 10 is for real time monitoring 12 of one or more environmental parameters 14, or conditions or events, in a structure 16, such as an interior 18 of the structure 16. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the environmental monitoring system 10 in FIG. 1 are not meant to imply physical or architectural limitations to the manner in which an illustrative example may be implemented. Other components in addition to, or in place of, the ones illustrated may be used. Some components may be unnecessary.

As shown in FIG. 1, the environmental monitoring system 10, for example, the temperature and humidity monitoring system 10*a*, may be used for real time monitoring 12 of the environmental parameters 14, or conditions or events, of the interior 18 of the structure 16, such as a vehicle 20, for example, an aircraft 22, a travel trailer 24, a rotorcraft 25, a watercraft 26, a train 28, a truck 30, or another suitable vehicle. As further shown in FIG. 1, the environmental monitoring system 10, for example, the temperature and humidity monitoring system 10*a*, may be used for real time monitoring 12 of the environmental parameters 14, or conditions or events, of the interior 18 of the structure 16, such as a building 32, including a dwelling structure 34, a warehouse 35, or another suitable building. The dwelling structure 34 may include a house, a condominium, a townhome, a cabin, a rental property, an apartment, a mobile home, or another suitable dwelling structure. As further shown in FIG. 1, the structure 16 has the interior 18 and an exterior 38. Where the structure comprises an aircraft 22, the interior 18 of the aircraft 22 that may be monitored by the environmental monitoring system 10 includes one or more of, a cabin, a cargo hold, a cockpit, a fuel tank, a jet engine interior, or another suitable interior area of the aircraft 22.

Preferably, the environmental monitoring system 10, such as the temperature and humidity monitoring system 10*a*, is used for real time monitoring 12 of the environmental parameters 14, or conditions, of the interior 18 of the structure 16, such as a vehicle 20, for example, the aircraft 22, if the vehicle 20 is parked or out of service in short term storage for a time period of one week to several weeks, or if the vehicle 20 is parked or out of service in long term storage for several months or more.

As shown in FIG. 1, the environmental monitoring system 10 comprises one or more sensors 40 (see also FIG. 6A) positioned at one or more locations 42 in the interior 18 of the structure 16. The one or more sensors 40 are each configured to collect environmental data 44 (see FIG. 1) relating to the one or more environmental parameters 14 of the interior 18, such as air 45 (see FIG. 1) in the interior 18 of the structure 16, to obtain collected environmental data 44*a* (see FIG. 1). As shown in FIG. 1, the one or more sensors 40 may each comprise a temperature sensor 40*a* for sensing or measuring an environmental parameter 14, or condition or event, such as a temperature 46 of the interior 18, such as the air 45 in the interior 18, of the structure 16. The one or more sensors 40 may each further comprise a humidity sensor 40*b* (see FIG. 1) for sensing or measuring an environmental parameter 14, or condition or event, such as a humidity 48 (see FIG. 1) of the interior 18, such as the air 45 in the interior 18, of the structure 16. As used herein, "humidity" means relative humidity which is a ratio, expressed as a percentage from 0 to 100, of the moisture content of air at a certain temperature in relation to the moisture content of moisture-saturated air at the same temperature.

The one or more sensors 40 may each further comprise a combined temperature-humidity sensor 40*c* (see FIG. 1) for sensing or measuring the environmental parameters 14, or conditions or events, such as both the temperature 46 and the humidity 48 of the interior 18, such as the air 45 in the interior 18, of the structure 16. The one or more sensors 40 may further comprise another suitable sensor to detect other vital conditions.

Further, if both the temperature 46 and the humidity 48 are sensed or measured of the interior 18, such as the air 45 in the interior 18, of the structure 16, a dew point 50 (see FIG. 1) can be calculated. As used herein, "dew point" means a temperature to which air must be cooled to become saturated with water vapor, assuming constant air pressure and water content, and when cooled below the dew point, moisture capacity is reduced and airborne water vapor will condense to form liquid water known as dew. The dew point 50 is important for keeping the moisture under control in the interior 18 of the structure 16, such as the aircraft 22.

In one version, the interior 18 of the structure 16, for example, the aircraft 22, has a single sensor 40. In another version, the interior 18 of the structure 16, for example, the aircraft 22, has more than one sensor 40. In one version, where the structure 16 comprises the aircraft 22, the single sensor 40 is mounted in a location 42 (see FIG. 9A) at a forward galley 52 (see FIG. 9A) in the interior 18 of the aircraft 22, such as near plumbing for the forward galley 52. However, in other versions, the one or more sensors 40 may be mounted in other locations 42 in the interior 18 of the aircraft 22.

Each of the one or more sensors 40 may be wired 54 (see FIG. 1) or wireless 56 (see FIG. 1). The one or more sensors 40 that are wired 54 may be connected to one or more wires 58 (see FIGS. 1, 9A), or wiring, that runs from the interior 18 of the structure 16, such as the aircraft 22, to the exterior 38, or outside, of the structure 16, such as the aircraft 22. The one or more wires 58, or wiring, may be connected to a breakaway connector 60 (see FIG. 9A) located at the exterior 38, or outside, the structure 16, such as the aircraft 22. The breakaway connector 60 is configured to allow the one or more wires 58, or wiring, to be easily separated and connected. Securing elements 62 (see FIG. 9A), such as tape 64 (see FIG. 9A), or a wiring shield 66 (see FIGS. 9A-9D), may be used to secure the one or more wires 58 to the interior 18 and/or to the exterior 38 of the structure 16, such as the aircraft 22.

Figure 6B:
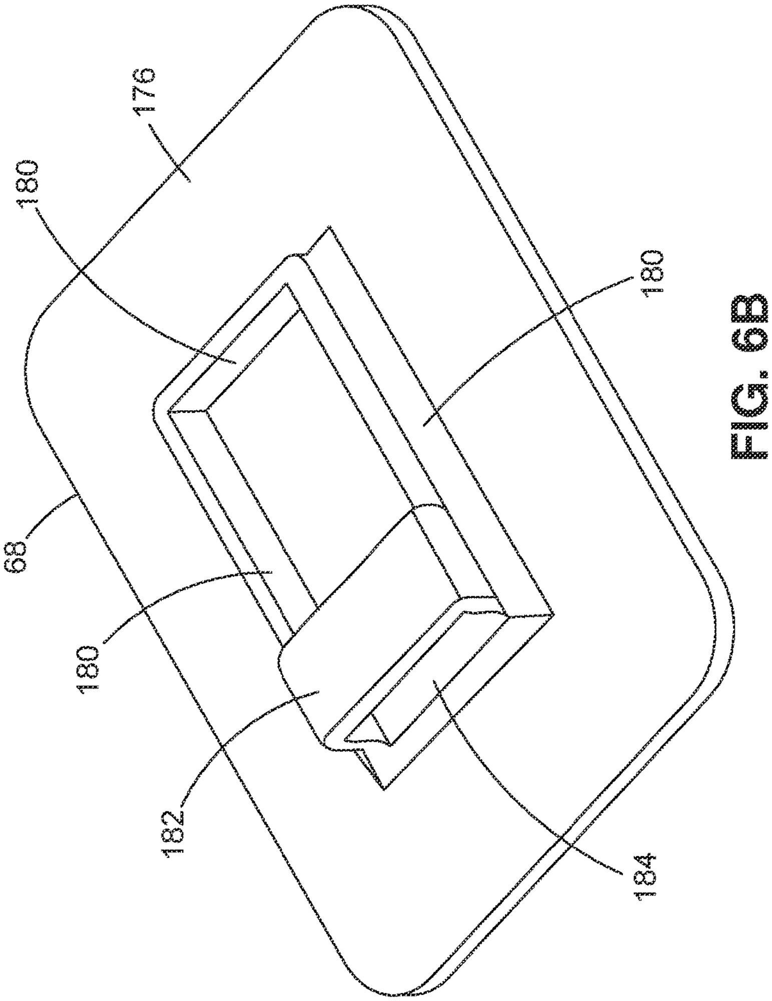
FIG. 6B is an illustration of a front perspective view of a sensor enclosure for use with the sensor of FIG. 6A.
Figure 6C:
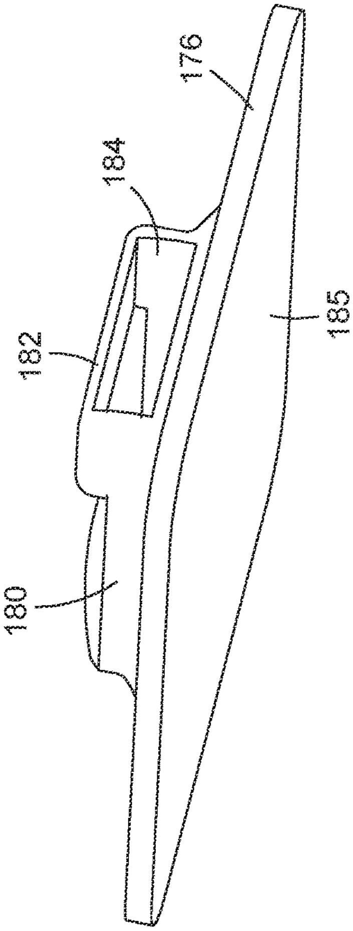
FIG. 6C is an illustration of a bottom perspective view of the sensor enclosure of FIG. 6B.

As shown in FIGS. 1, 6B-6C, a sensor enclosure 68, or housing, may be used to enclose or house a sensor 40. The sensor enclosure 68 may be 3D (three-dimensional) printed, and the sensor 40 may be secured and fitted within, such as snap fitted within, the sensor enclosure 68 to protect the sensor 40, and to allow for easy installation and attachment of the sensor 40 in the interior 18 of the structure 16, such as the aircraft 22. The sensor enclosure 68 is discussed in further detail below with respect to FIGS. 6B-6C.

As shown in FIG. 1, the environmental monitoring system 10 further comprises a microprocessor system 70 coupled or connected to the one or more sensors 40. The microprocessor system 70 is configured to process the collected environmental data 44*a*, to obtain processed environmental data 44*b* (see FIG. 1), and the microprocessor system 70 is configured to compare the processed environmental data 44*b* to one or more predetermined values 72 (see FIG. 1), to perform a comparison 74 (see FIG. 1), to obtain environmental data results 44*c* (see FIG. 1). The microprocessor system 70 may be wired 54*a* or wireless 56*a*, and the microprocessor system 70 may be wired with wires 58*a* in various different ways. In one exemplary version, a user can hook up a monitor to a USB (universal serial bus) port on the microprocessor system 70, and it will display onto a screen the temperature 46 and the humidity 48, for example, once a second, or another suitable time interval. In one exemplary version, the microprocessor system 70 is located at the exterior 38, or outside, the structure 16, such as the aircraft 22. However, in another version, the microprocessor system 70 is located at a location 42 in the interior 18 of the structure 16, such as the aircraft 22

As used herein, "predetermined values" mean a threshold between in-specification environmental parameters and out-of-specification environmental parameters.

As shown in FIG. 1, the environmental monitoring system 10 further comprises a power supply 76 coupled to the microprocessor system 70, and/or coupled to the one or more sensors 40, and/or coupled to a visual feedback display assembly 80 (see FIG. 1). The power supply 76 supplies power 78 (see FIG. 1) to the microprocessor system 70, and/or the one or more sensors 40, and/or to the visual feedback display assembly 80 (see FIG. 1). The power supply 76 comprises one or more electrical elements supplying electricity, one or more batteries supplying battery power, one or more solar chargers supplying solar power, or another suitable power supply. In one version, the power supply 76 comprises a 120 volt transformer to power the sensor 40 and/or the microprocessor system 70 and/or the visual feedback display assembly 80. If the one or more sensors 40, the microprocessor system 70, and/or the visual feedback display assembly 80 are in the interior 18 of the structure 16, or at the exterior 38 of the structure 16, which is positioned at a remote location 42*a* (see FIG. 1), they may be battery powered.

As shown in FIG. 1, the environmental monitoring system 10 further comprises the visual feedback display assembly 80 coupled to the microprocessor system 70. The visual feedback display assembly 80 is configured to provide an alert signal 82 (see FIG. 1) using one or more visual signals 84 (see FIG. 1), one or more audio signals 86 (see FIG. 1), one or more radio frequency (RF) signals 88 (see FIG. 1) in a radio transmitter, or another suitable signal. The radio frequency (RF) signal 88 may comprise a one-way radio frequency (RF) signal that informs a user that the interior 18 of the structure 16, such as the aircraft 22, has one or more environmental parameters 14 that are out-of-specification environmental parameters 14*b* (see FIG. 1). An RF receiver may be used to receive the one or more RF signals 88

The one or more alert signals 82, such as the one or more visual signals 84, correspond to one or more of the environmental parameters 14, such as one or more in-specification environmental parameters 14*a* (see FIG. 1) of the interior 18, such as the air 45 in the interior 18, of the structure 16, and such as one or more out-of-specification environmental parameters 14*b* (see FIG. 1) of the interior 18, such as the air 45 in the interior 18, of the structure 16. As discussed above, the environmental parameters 14 comprise one or more of, the temperature 46 of the interior 18 of the structure 16, such as the temperature 46 of the air 45 in the interior 18 of the structure 16, the humidity 48 of the interior 18 of the structure 16, such as the humidity 48 of the air 45 in the interior 18 of the structure 16, and the dew point 50 of the interior 18 of the structure 16, where the dew point 50 is calculated based on the temperature 46 and the humidity 48 of the collected environmental data 44*a*.

Preferably, when the structure 16 comprises the aircraft 22, the visual feedback display assembly 80 uses one or more visual signals 84 for users or viewers to be able to see or view across an airfield 90 (see FIG. 2), a runway 92 (see FIG. 3), or another area where aircraft 22 are stored or parked for environmental monitoring with the environmental monitoring system 10 disclosed herein. As used herein, "airfield" means an open field designated for the taking off and landing of aircraft, but which, unlike an airport, may not be as sophisticated, or may be used by the military.

Figure 2:
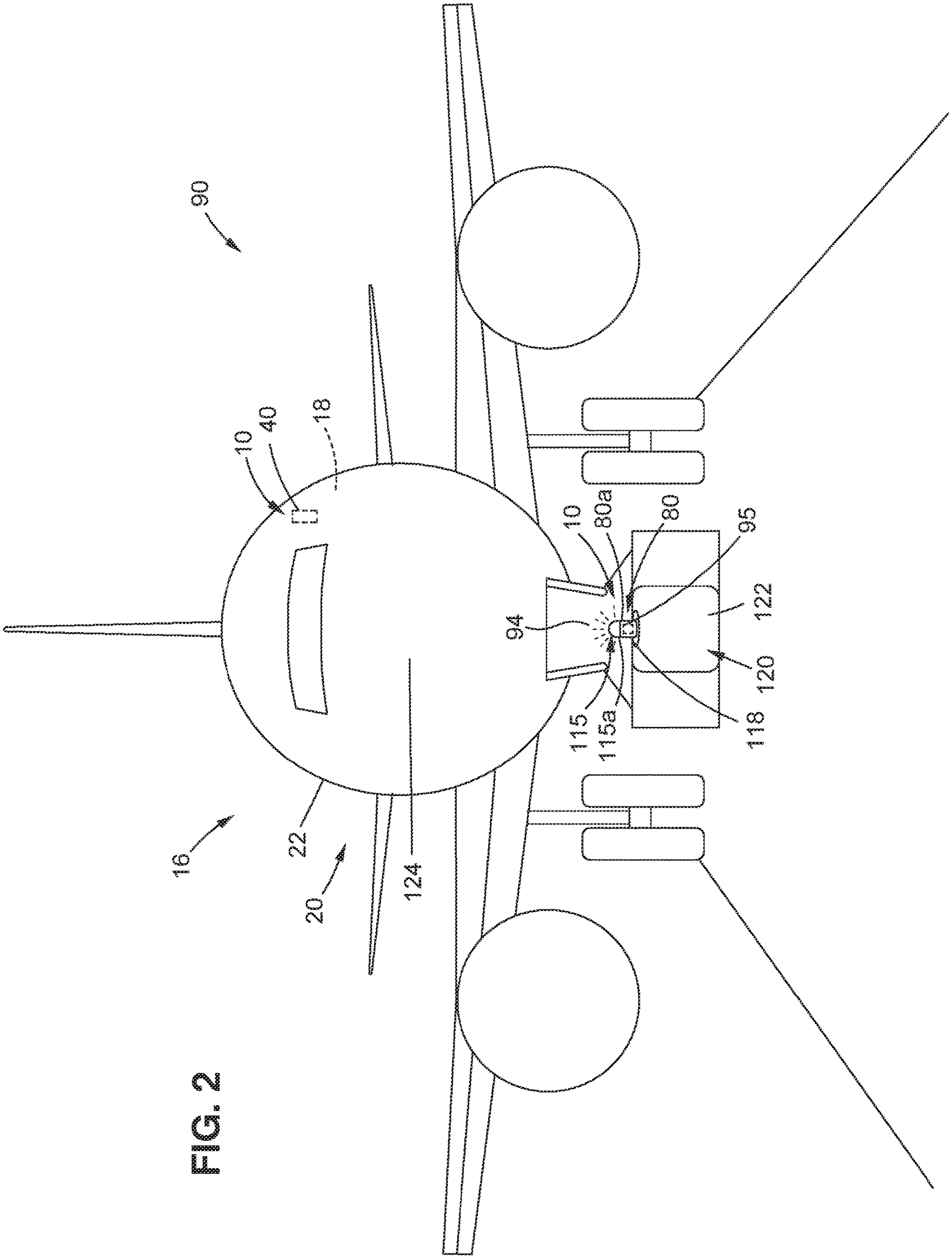
FIG. 2 is an illustration of a front view of an exemplary version of an environmental monitoring system of the disclosure, having a sensor in an interior of an aircraft and having a visual feedback display assembly mounted on a nosewheel anchor block positioned in front of the aircraft.

As shown in FIGS. 1, 2, in one version, the visual feedback display assembly 80 comprises a multicolor light feedback display assembly 80*a* mounted exterior 38 to the structure 16, such as the aircraft 22. The multicolor light feedback display assembly 80*a* has a plurality of light emitting diode (LED) color signal lights 94 (see FIG. 1) that emit one or more colors 93 (see FIG. 1). In one version, the plurality of LED color signal lights 94 comprises an RGB (red-green-blue) color LED (light emitting diode) module 95 (see FIG. 1), such as a programmable RGB color LED module 95*a* (see FIG. 1). For example, in one version, the plurality of light emitting diode (LED) color signal lights 94 in the form of the RGB color LED module 95 emits colors 93, including a red color 96 (see FIG. 1), a green color 98 (see FIG. 1), and a blue color 100 (see FIG. 1). The three red, green, and blue colors 96, 98, 100, respectively, may be combined and programmed in any number of combinations to create numerous colors corresponding to various environmental parameters 14. For example, a combination of the red color 96 and the green color 98 creates a yellow color 102 (see FIG. 1), and a combination of the red color 96 and the blue color 100 creates a purple color 104 (see FIG. 1). With the programmable RGB color LED module 95*a*, the percentages of brightness of each color 93, such as the red color 96, the green color 98, and the blue color 100, are programmed and combined to create any number of colors 93 and color lights.

Figure 4A:
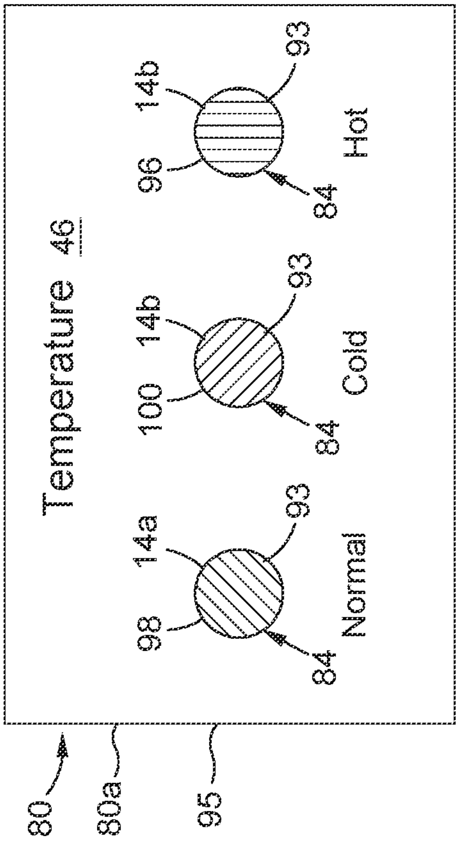
FIG. 4A is a schematic diagram of visual signals corresponding to the environmental parameter comprising temperature.
Figure 4B:
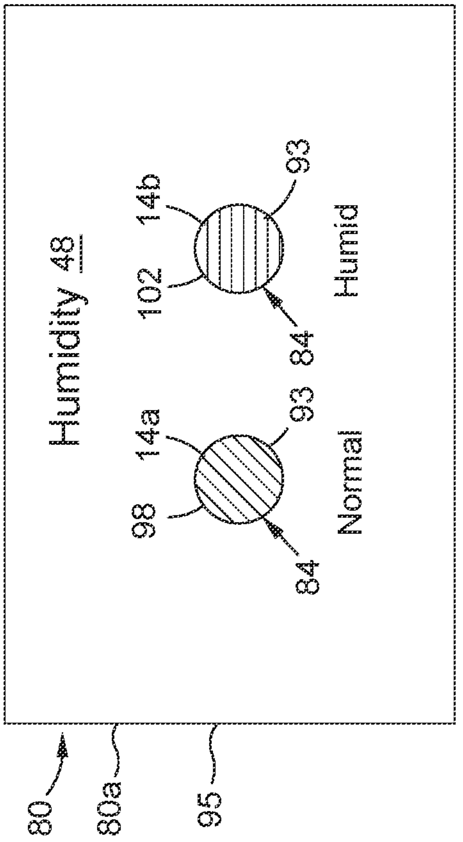
FIG. 4B is a schematic diagram of visual signals corresponding to the environmental parameter comprising humidity.
Figure 4C:
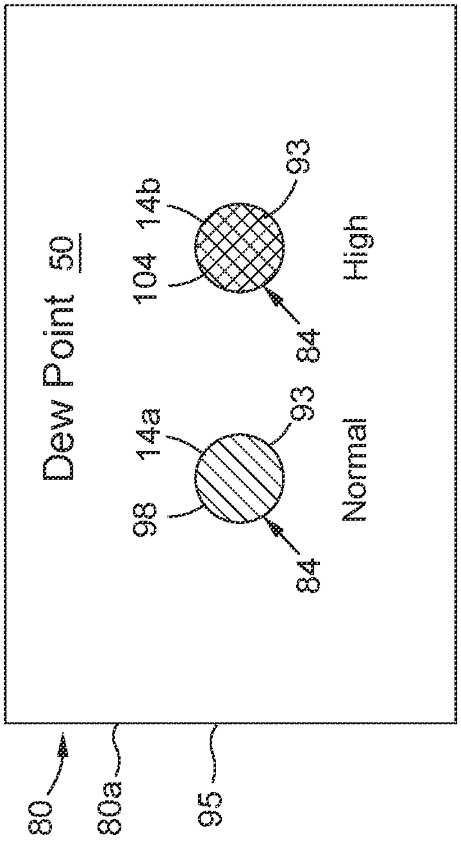
FIG. 4C is a schematic diagram of visual signal corresponding to the environmental parameter comprising dew point.

In one version, as shown in FIGS. 4A-4C, the visual feedback display assembly 80, such as the multicolor light feedback display assembly 80*a*, for example, the RGB color LED module 95, emits and uses the green color 98 (see FIG. 4A) to indicate an in-specification environmental parameter 14*a* (see FIGS. 1, 4A). The in-specification environmental parameter 14*a* comprises a predetermined value 72 (see FIG. 1) within a predetermined value range 106 (see FIG. 1), such as a predetermined temperature range 108 (see FIG. 1), a predetermined humidity range 110 (see FIG. 1), and a calculated dew point 112 (see FIG. 1). In one version, the predetermined temperature range 108 comprises between 40 degrees Fahrenheit (4.4 degrees Celsius) and 80 degrees Fahrenheit (26.7 degrees Celsius). In one version, the predetermined humidity range 110 comprises 60% and below 60% humidity 48. In one version, the calculated dew point 112 is calculated based on the temperature 46 and the humidity 48, for example, multiplying 17.625 by the temperature and dividing the result by the temperature plus 243.04, and taking the natural logarithm of the humidity divided by 100 and adding it to the result of the previous step. In other versions, one skilled in the art may obtain the calculated dew point 112 based on another suitable calculation using the temperature and humidity, or by using a psychrometric chart for dew point, or by using another suitable dew point determination. If the temperature 46 in the interior 18 of the structure 16, such as the aircraft 22, is in the predetermined temperature range 108, the green color 98 will glow or emit from the visual feedback display assembly 80, such as the multicolor light feedback display assembly 80*a*. If the humidity 48 in the interior 18 of the structure 16, such as the aircraft 22, is in the predetermined humidity range 110, the green color 98 will glow or emit from the visual feedback display assembly 80, such as the multicolor light feedback display assembly 80*a*. If the dew point 50 in the interior 18 of the structure 16, such as the aircraft 22, is inside the calculated dew point 112, the green color 98 will glow or emit from the visual feedback display assembly 80, such as the multicolor light feedback display assembly 80*a*.

In one version, as shown in FIGS. 4A-4C, the visual feedback display assembly 80, such as the multicolor light feedback display assembly 80*a*, for example, the RGB color LED module 95, emits and uses the red color 96 (see FIG. 4A), the blue color 100 (see FIG. 4A), the yellow color 102 (see FIG. 4B), and the purple color 104 (see FIG. 4C) to indicate out-of-specification environmental parameters 14*b* (see FIGS. 1, 4A-4C). The out-of-specification environmental parameters 14*b* comprise environmental parameters 14, such as temperature 46, humidity 48, and dew point 50, outside the predetermined value ranges 106 (see FIG. 1), such as outside the predetermined temperature range 108 (see FIG. 1), outside the predetermined humidity range 110 (see FIG. 1), and outside the calculated dew point 112 (see FIG. 1).

For example, in one version, the visual feedback display assembly 80, such as the multicolor light feedback display assembly 80*a*, for example, the RGB color LED module 95, emits and uses the blue color 100 (see FIG. 4A) to indicate an out-of-specification environmental parameter 14*b* (see FIGS. 1, 4A), such as the temperature 46 outside the predetermined temperature range 108, where the temperature 46 is below 40 degrees Fahrenheit (4.4 degrees Celsius).

If the temperature 46 in the interior 18, such as the temperature 46 of the air 45 in the interior 18, of the structure 16, such as the aircraft 22, falls below 40 degrees Fahrenheit (4.4 degrees Celsius), the blue color 100 will glow or emit from the visual feedback display assembly 80, such as the multicolor light feedback display assembly 80*a*, to indicate the interior 18 of the structure 16 is too cold or freezing.

In addition, for example, in one version, the visual feedback display assembly 80, such as the multicolor light feedback display assembly 80*a*, for example, the RGB color LED module 95, emits and uses the red color 96 (see FIG. 4A) to indicate an out-of-specification environmental parameter 14*b* (see FIGS. 1, 4A), such as the temperature 46 outside the predetermined temperature range 108, where the temperature 46 is above 80 degrees Fahrenheit (26.7 degrees Celsius). If the temperature 46 in the interior 18, such as the temperature 46 of the air 45 in the interior 18, of the structure 16, such as the aircraft 22, rises above 80 degrees Fahrenheit (26.7 degrees Celsius), the red color 96 will glow or emit from the visual feedback display assembly 80, such as the multicolor light feedback display assembly 80*a*, to indicate the interior 18 of the structure 16 is too hot.

In addition, for example, in one version, the visual feedback display assembly 80, such as the multicolor light feedback display assembly 80*a*, for example, the RGB color LED module 95, is programmed to use the yellow color 102 (see FIG. 4A), created by a combination of the red color 96 and the green color 98, to indicate an out-of-specification environmental parameter 14*b* (see FIGS. 1, 4A), such as the humidity 48 outside the predetermined humidity range 110, where the humidity 48 is above 60% humid. If the humidity 48 in the interior 18, such as the humidity 48 of the air 45 in the interior 18, of the structure 16, such as the aircraft 22, rises above 60% humid, the yellow color 102 will glow or emit from the visual feedback display assembly 80, such as the multicolor light feedback display assembly 80*a*, to indicate the interior 18 of the structure 16 is too humid.

In addition, for example, in one version, the visual feedback display assembly 80, such as the multicolor light feedback display assembly 80*a*, for example, the RGB color LED module 95, is programmed to use the purple color 104 (see FIG. 4A), created by a combination of the red color 96 and the blue color 100, to indicate an out-of-specification environmental parameter 14*b* (see FIGS. 1, 4A), such as the dew point 50 outside the calculated dew point 112. If the dew point 50 in the interior 18 of the structure 16, such as the aircraft 22, is outside the calculated dew point 112, the purple color 104 will glow or emit from the visual feedback display assembly 80, such as the multicolor light feedback display assembly 80*a*, to indicate the interior 18 of the structure 16 has dew formation and is too humid.

In one version, the green color 98 (see FIG. 1) is continuously on and will pulsate and change from the green color 98 to another color, if there is an out-of-specification environmental parameter 14*b*, for example, the green color 98 may change to the red color 96 if the temperature 46 is too high, e.g., greater than 80 degrees Fahrenheit (26.7 degrees Celsius), and the interior 18 of the structure 16, such as the aircraft 22, is too hot, and a few seconds in time later, the green color 98 comes back on, and for example, the green color 98 may change to the yellow color 102 if the humidity 48 is too high, e.g., greater than 60% humid, in the interior 18 of the structure 16, such as the aircraft 22, and a few seconds in time later, the green color 98 comes back on. The visual feedback display assembly 80, such as the multicolor light feedback display assembly 80*a*, for example, the RGB color LED module 95, cycles through the various colors 93, depending on whether one or more of the environmental parameters 14 is an out-of-specification environmental parameter 14*b*. If the temperature 46, the humidity 48, and/or the dew point 50 of the interior 18 of the structure 16, such as the air 45 in the interior 18 of the structure 16, such as the aircraft 22, is outside the desired predetermined range, such as outside the predetermined temperature range 108, outside the predetermined humidity range 110, and/or outside the calculated dew point 112, the light emitting diode (LED) color signal light 94 will change from the green color 98 to the red color 96 (see FIG. 4A) to indicate a too hot temperature, or the blue color 100 (see FIG. 4A) to indicate a too cold temperature, or the yellow color 102 (see FIG. 4B) to indicate a too high humidity, or the purple color 104 (see FIG. 4C) to indicate the dew point 50 has been reached and/or exceeded.

The visual feedback display assembly 80, such as the multicolor light feedback display assembly 80*a*, provides real time monitoring 12 (see FIG. 1) and instant feedback regarding the environmental parameters 14, or environmental conditions or events, of the interior 18 of the structure 16, such as the aircraft 22. In addition, the visual feedback display assembly 80, such as the multicolor light feedback display assembly 80*a*, can be seen from long distances without the need to enter the structure 16, such as the aircraft 22, or without the need to unseal a sealed aircraft 22*a* (see FIG. 1). The LED color signal lights 94 will be bright enough to be seen by persons on the ground or passing by in a vehicle. If an out-of-specification environmental parameter 14*b* or event or condition occurs, a visual signal 84 with a color 93 that corresponds to the out-of-specification environmental parameter 14*b*, or event or condition will be illuminated with the LED color signal lights 94. The environmental monitoring system 10 provides valuable information to attending mechanics, maintenance crew, users, operators, inspectors, or others, about the interior 18, such as a sealed interior 18*a*, of the structure 16, such as aircraft 22, for example, the sealed aircraft 22*a*. Alternatively, the environmental monitoring system 10 is optionally configured for remote monitoring 114 (see FIG. 1) with a remote device 138 (see FIG. 1) or a remote system, discussed below.

Figure 5B:
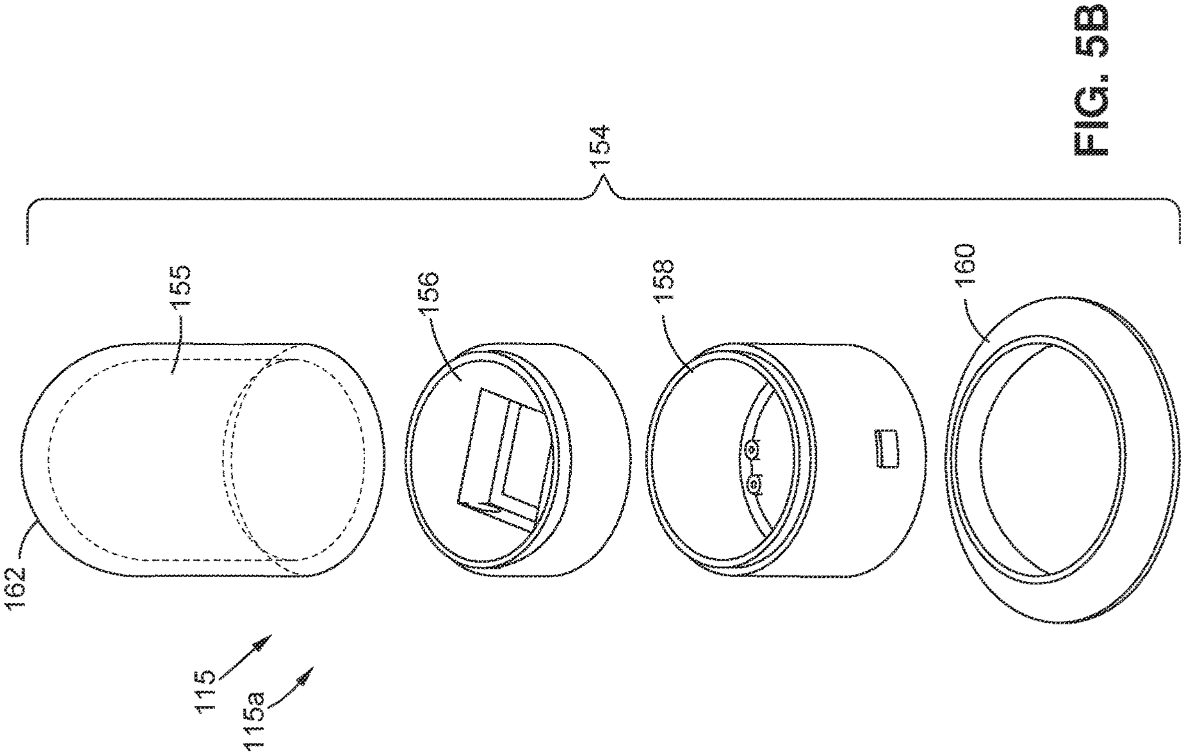
FIG. 5B is an illustration of a front top perspective view of an unassembled version of the domed housing apparatus of FIG. 5A.
Figure 5A:
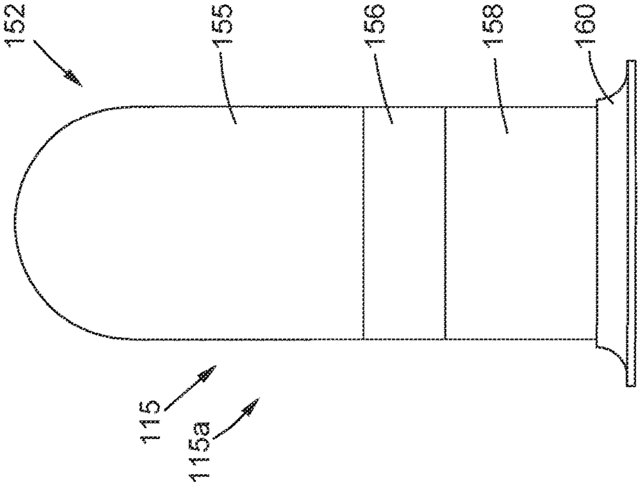
FIG. 5A is an illustration of a front view of an assembled version of a domed housing apparatus for housing a version of a visual feedback display assembly.

In one version, the visual feedback display assembly 80, such as the multicolor light feedback display assembly 80*a*, for example, the RGB color LED module 95, is housed or enclosed within a housing apparatus 115 (see FIGS. 1, 5A), such as a domed housing apparatus 115*a* (see FIGS. 1, 5A). The housing apparatus 115, such as the domed housing apparatus 115*a*, functions as a light diffuser 116 (see FIG. 1) that diffuses the LED color signal lights 94 emitting colors 93 from the housing apparatus 115, such as the domed housing apparatus 115*a*. The housing apparatus 115, such as the domed housing apparatus 115*a*, may have a pattern formed on the surface that facilitates light diffusion and helps the housing apparatus 115, such as the domed housing apparatus 115*a*, to function as the light diffuser 116. The housing apparatus 115, such as the domed housing apparatus 115*a*, with the enclosed visual feedback display assembly 80, such as the multicolor light feedback display assembly 80*a*, for example, the RGB color LED module 95, is configured to emit colors 93 of the LED color signal lights 94 in an area of 360 degrees around the housing apparatus 115, such as the domed housing apparatus 115*a*.

In one version, as shown in FIG. 2, the housing apparatus 115, such as the domed housing apparatus 115*a*, housing or enclosing the visual feedback display assembly 80, such as the multicolor light feedback display assembly 80*a*, for example, the RGB color LED module 95, is mounted to a mounting ring 118 on a mounting structure 120, such as a nosewheel anchor block 122, positioned exterior 38 to the structure 16, such as the aircraft 22, in front of a nose 124 of the structure 16, such as the aircraft 22. Alternatively, the housing apparatus 115, such as the domed housing apparatus 115*a*, housing or enclosing the visual feedback display assembly 80, such as the multicolor light feedback display assembly 80*a*, for example, the RGB color LED module 95, may be mounted at another exterior location outside the structure 16, such as the aircraft 22, or may be mounted in the interior 18 of the structure 16, such as the aircraft 22.

The housing apparatus 115, such as the domed housing apparatus 115*a*, is preferably made of a plastic material or thermoplastic material, such as polyethylene terephthalate glycol, commonly known as PETG, which provides significant chemical resistance, durability, and excellent formability for manufacturing, and which can be easily used in 3D (three-dimensional) printers for 3D (three-dimensional) printing, or other heat-forming manufacturing processes, to manufacture the housing apparatus 115, such as the domed housing apparatus 115*a*. The housing apparatus 115, such as the domed housing apparatus 115*a*, may also be made of another plastic material or thermoplastic material, such as acrylic, polycarbonate, polypropylene, polyethylene, or another suitable plastic or thermoplastic material. The housing apparatus 115, such as the domed housing apparatus 115*a*, may be 3D (three-dimensional) printed, or may be made with another suitable forming or manufacturing process.

The housing apparatus 115, such as the domed housing apparatus 115*a*, is discussed in further detail below with respect to FIGS. 5A-5F.

As shown in FIG. 1, the environmental monitoring system 10 may further comprise one or more optional features 125, or enhancements. As shown in FIG. 1, the environmental monitoring system 10 may further comprise a global positioning system (GPS) 126, to provide a global positioning system (GPS) location 128 of the structure 16, such as the aircraft 22. The GPS 126 allows for reporting the GPS location 128 of the structure 16, such as the aircraft 22, if it moves or is moved. The GPS 126, in the form of a GPS device or apparatus may be coupled, or attached, to the visual feedback display assembly 80, when the visual feedback display assembly 80 is exterior 38 to the structure 16, such as the aircraft 22. Alternatively, the GPS may be positioned at another location exterior 38 to the structure 16, such as the aircraft 22, or the GPS 126 may be coupled, or attached, to the interior 18 of the structure 16, such as the aircraft 22, when the visual feedback display assembly 80 is positioned in the interior 18 of the structure 16, such as the aircraft 22.

As shown in FIG. 1, the environmental monitoring system 10 may further comprise a motion detector device 130, to sense a motion 132 of the structure 16, such as the aircraft 22, if it moves or is moved. The motion detector device 130 may be positioned exterior 38 to the structure 16, such as the aircraft 22, or interior 18 of the structure 16, such as the aircraft 22.

As shown in FIG. 1, the environmental monitoring system 10 may further comprise an interface 134 for a collective network 135 of connected devices 136 and technology that facilitates communication between the connected devices 136, to provide remote monitoring 114 on a remote device 138. The interface 134 preferably comprises an IOT (internet of things) interface 218 (see FIG. 10) that may be installed in, or coupled to, the visual feedback display assembly 80 exterior 38 to the structure 16, such as the aircraft 22, or may be positioned at another location exterior 38 to the structure 16, such as the aircraft 22, or may be installed in, or coupled to, the interior 18 of the structure 16, such as the aircraft 22.

As shown in FIG. 1, the environmental monitoring system 10 may further comprise a wireless network 140, to allow the environmental data 44 to be collected remotely, so that a human user could be dispatched to the structure 16, such as the aircraft 22, if there is an alert signal 82 of one or more out-of-specification environmental parameters 14*b*, or conditions, or events. This optional feature 125, or enhancement, may also include use of the GPS 126, such as a GPS tag or module, to provide the GPS location 128 of the structure 16, such as the aircraft 22. Additional software may be used to track the issues. If the human user is already in an area, such as the airfield 90 or runway 92, that has a wireless network 140 set up, it may be easy to incorporate the one or more sensors 40, the microprocessor system 70, and the visual feedback display assembly 80 of the environmental monitoring system 10 into the wireless network 140.

As shown in FIG. 1, the environmental monitoring system 10 may further comprise a short-range wireless technology 142, for example, Bluetooth, to exchange the environmental data results 44*c* between fixed devices 144 and mobile devices 145, such as cell phones 146. The short-range wireless technology 142 may be coupled or attached to the visual feedback display assembly 80 at the exterior 38 of the structure 16, such as the aircraft 22, so that when a human user approaches, the human user may download the environmental data results 44*c* from the microprocessor system 70, to view the history of a time period, e.g., the last 24 hours, of the sensor 40 sensing the interior 18 of the structure 16, such as the aircraft 22. The alert signals 82 may transmit across the short-range wireless technology 142 to a mobile device 145, such as a cell phone 146, of the human user, to give alert signal 82, such as the visual signal 84, the audio signal 86, or another suitable signal. One or more of the out-of-specification environmental parameters 14*b*, or conditions, or events, may be sent to the mobile device 145, such as the cell phone 146, outside the structure 16, such as the aircraft 22, to alert a human user of one or more of the out-of-specification environmental parameters 14*b*, or conditions, or events.

Another option for a remote location 42*a* (see FIG. 1) is to put a SIM (Subscriber Identification Module) card 148 (see FIG. 1) in the environmental monitoring system 10, and it can call or communicate to a mobile device 145, such as a cell phone 146, from the remote location 42*a*, as long as there is cellular phone service.

As further shown in FIG. 1, the environmental monitoring system 10 may be used with a computer system 150 to download, review, analyze, display, or perform another suitable function with the environmental data results 44*c*. The computer system 150 is discussed in further detail below with respect to FIG. 10.

Now referring to FIG. 2, FIG. 2 is an illustration of a front view of an exemplary version of an environmental monitoring system 10 of the disclosure, having a sensor 40 in an interior 18 of a structure 16, such as a vehicle 20, for example, an aircraft 22, and having a visual feedback display assembly 80, such as a multicolor light feedback display assembly 80*a*, for example, the RGB color LED module 95, mounted to a mounting ring 118 on a mounting structure 120, such as a nosewheel anchor block 122, positioned exterior 38 to the structure 16, such as the vehicle 20, for example, the aircraft 22, in front of a nose 124 of the structure 16, such as the aircraft 22. FIG. 2 further shows the housing apparatus 115, such as the domed housing apparatus 115*a*, housing or enclosing the visual feedback display assembly 80, such as the multicolor light feedback display assembly 80*a*, for example, the RGB color LED module 95. The microprocessor system 70 (see FIG. 1) and the power supply 76 (see FIG. 1) are also coupled to the visual feedback display assembly 80. FIG. 2 further shows the structure 16, such as the aircraft 22, parked on the airfield 90. As shown in FIG. 2, in this version, the housing apparatus 115, such as the domed housing apparatus 115*a*, with the visual feedback display assembly 80, is mounted on the mounting structure 120 at the nose 124 of the aircraft 22 and emits an LED color signal light 94 or glows for a human user walking or driving by to easily see.

Figure 3:
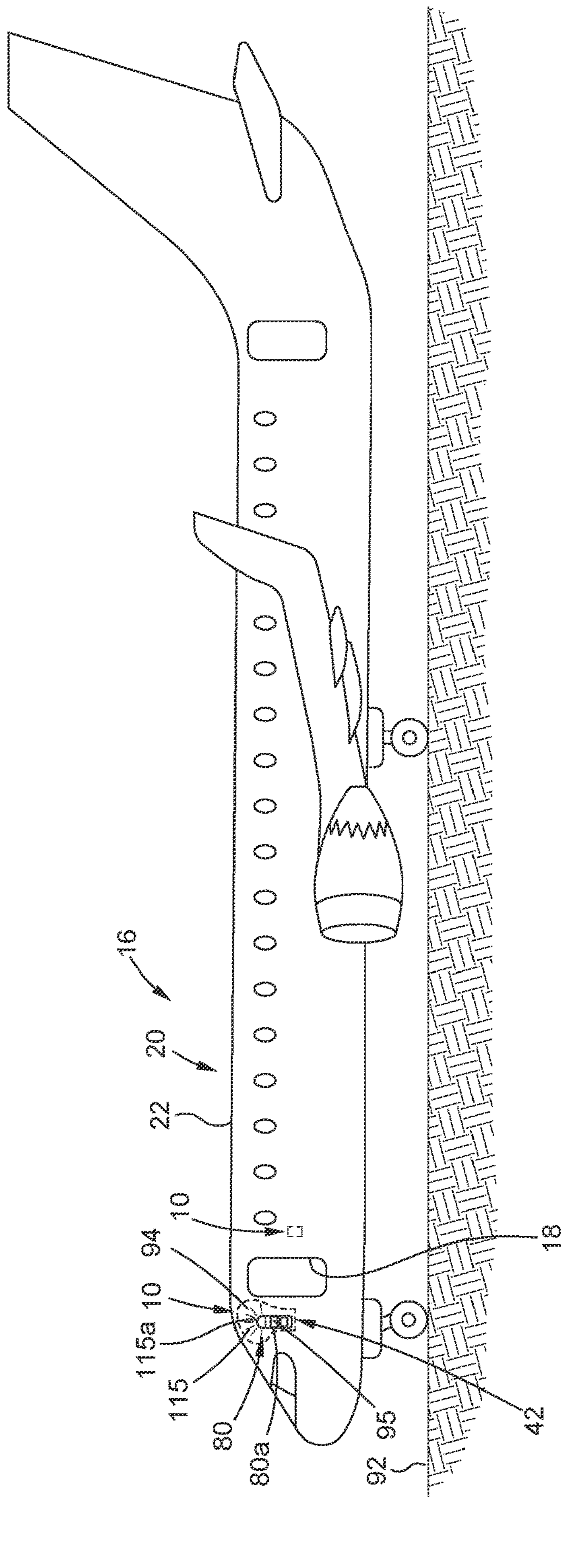
FIG. 3 is an illustration of a perspective side view of an aircraft with an exemplary environmental monitoring system installed in an interior of the aircraft.

Now referring to FIG. 3, FIG. 3 is an illustration of a perspective side view of a structure 16 in the form of a vehicle 20, such as an aircraft 22, with an exemplary environmental monitoring system 10 installed in the interior 18 of the aircraft 22, such as a cabin in the aircraft 22. As shown in FIG. 3, the sensor 40 of the environmental monitoring system 10 is located and positioned in the interior 18 of the aircraft 22 and the visual feedback display assembly 80, such as the multicolor light feedback display assembly 80*a*, for example, the RGB color LED module 95 is located and positioned in the interior 18 of the aircraft 22. FIG. 3 further shows the housing apparatus 115, such as the domed housing apparatus 115*a*, housing or enclosing the visual feedback display assembly 80, such as the multicolor light feedback display assembly 80*a*, for example, the RGB color LED module 95. The microprocessor system 70 (see FIG. 1) and the power supply 76 (see FIG. 1) are also coupled to the visual feedback display assembly 80. FIG. 3 further shows the structure 16, such as the aircraft 22, parked on the runway 92. As shown in FIG. 3, in this version, the housing apparatus 115, such as the domed housing apparatus 115*a*, with the visual feedback display assembly 80, is mounted at a location 42 in the interior 18 of the aircraft 22 and emits an LED color signal light 94, or glows, for a human user to receive a visual signal 84 remotely on a remote device 138 (see FIG. 1), such as a mobile device 145 (see FIG. 1), for example, a cell phone 146 (see FIG. 1).

Now referring to FIGS. 4A-4C, FIGS. 4A-4C are schematic diagrams showing visual signals 84 in the forms of various colors 93 corresponding to various environmental parameters 14, or conditions or events. FIG. 4A is a schematic diagram of visual signals 84 corresponding to the environmental parameter 14 comprising temperature 46. FIG. 4B is a schematic diagram of visual signals 84 corresponding to the environmental parameter 14 comprising humidity 48. FIG. 4C is a schematic diagram of visual signals 84 corresponding to the environmental parameter 14 comprising dew point 50.

As shown in FIG. 4A, the visual feedback display assembly 80, such as the multicolor light feedback display assembly 80*a*, for example, the RGB color LED module 95 shows the green color 98 to indicate "Normal" and an in-specification environmental parameter 14*a* for temperature 46, shows the blue color 100 to indicate "Cold" and an out-of-specification environmental parameter 14*b* for temperature 46, and shows the red color 96 to indicate "Hot" and an out-of-specification environmental parameter 14*b* for temperature 46. If the temperature 46 in the interior 18, such as the temperature 46 of the air 45 in the interior 18, of the structure 16, such as the aircraft 22, falls below 40 degrees Fahrenheit (4.4 degrees Celsius), the blue color 100 will glow or emit from the visual feedback display assembly 80, such as the multicolor light feedback display assembly 80*a*, to indicate the interior 18 of the structure 16 is too cold or freezing. If the temperature 46 in the interior 18, such as the temperature 46 of the air 45 in the interior 18, of the structure 16, such as the aircraft 22, rises above 80 degrees Fahrenheit (26.7 degrees Celsius), the red color 96 will glow or emit from the visual feedback display assembly 80, such as the multicolor light feedback display assembly 80*a*, to indicate the interior 18 of the structure 16 is too hot.

As shown in FIG. 4B, the visual feedback display assembly 80, such as the multicolor light feedback display assembly 80*a*, for example, the RGB color LED module 95 shows the green color 98 to indicate "Normal" and an in-specification environmental parameter 14*a* for humidity 48, and shows the yellow color 102 to indicate "Humid" and an out-of-specification environmental parameter 14*b* for humidity 48. If the humidity 48 in the interior 18, such as the humidity 48 of the air 45 in the interior 18, of the structure 16, such as the aircraft 22, rises above 60% humid, the yellow color 102 will glow or emit from the visual feedback display assembly 80, such as the multicolor light feedback display assembly 80*a*, to indicate the interior 18 of the structure 16 is too humid.

As shown in FIG. 4C, the visual feedback display assembly 80, such as the multicolor light feedback display assembly 80*a*, for example, the RGB color LED module 95 shows the green color 98 to indicate "Normal" and an in-specification environmental parameter 14*a* for dew point 50, and shows the purple color 104 to indicate "High" and an out-of-specification environmental parameter 14*b* for dew point 50. If the dew point 50 in the interior 18 of the structure 16, such as the aircraft 22, is outside the calculated dew point 112, the purple color 104 will glow or emit from the visual feedback display assembly 80, such as the multicolor light feedback display assembly 80*a*, to indicate the interior 18 of the structure 16 has dew formation and is too humid. The colors 93 (see FIG. 1) of FIGS. 4A-4C of the visual feedback display assembly 80, such as the multicolor light feedback display assembly 80*a*, for example, the RGB color LED module 95, may also be viewed remotely on a remote device 138 (see FIG. 1), and shown on a screen or a display.

Now referring to FIGS. 5A-5F, FIGS. 5A-5F show an exemplary version of a housing apparatus 115, such as a dome housing apparatus 115*a*, used to house or enclose a version of a visual feedback display assembly 80 (see FIGS. 1, 7) that is part of the environmental monitoring system 10 (see FIG. 1) of the disclosure.

Figure 7:
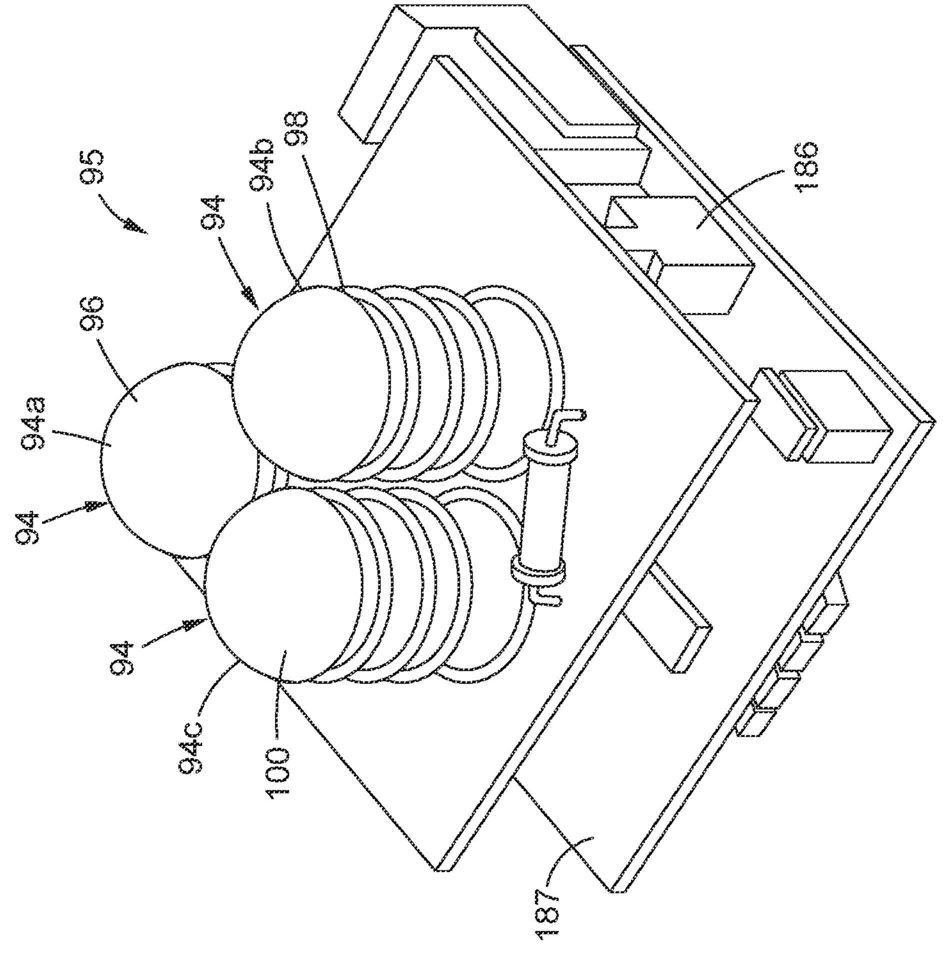
FIG. 7 is an illustration of a top perspective view of an exemplary RGB (red-green-blue) color light emitting diode (LED) module that is part of an exemplary version of an environmental monitoring system of the disclosure.

FIG. 5A is an illustration of a front view of an assembled version 152 of the housing apparatus 115, such as the domed housing apparatus 115*a*, for housing or enclosing a version of the visual feedback display assembly 80 (see FIGS. 1, 7). FIG. 5B is an illustration of a front top perspective view of an unassembled version 154 of the housing apparatus 115, such as the domed housing apparatus 115*a* of FIG. 5A. FIG. 5C is an illustration of a front bottom perspective view of the unassembled version 154 of the housing apparatus 115, such as the domed housing apparatus 115*a*, of FIG. 5B.

As shown in FIGS. 5A-5C, the housing apparatus 115, such as the domed housing apparatus 115*a*, comprises a dome portion 155, a first body portion 156, a second body portion 158, and a base portion 160. As shown in FIG. 5A, the dome portion 155 is the top portion and is coupled to a top end of the first body portion 156, such as by snap fitting or twist fitting the dome portion 155 to the top end of the first body portion 156. The dome portion 155 has a dome shape 162 (see FIG. 5B). As further shown in FIG. 5A, a bottom end of the first body portion 156 is coupled to a top end of the second body portion 158, such as by snap fitting or twist fitting the bottom end of the first body portion 156 to the top end of the second body portion 158. As further shown in FIG. 5A, a bottom end of the second body portion 158 is coupled to a top end of the base portion 160, such as by snap fitting or twist fitting the bottom end of the second body portion 158 to the top end of the base portion 160. As shown in FIG. 5A, in one version, the dome portion 155 has a greater height than both the first body portion 156 and the second body portion 158, and the second body portion 158 has a greater height than the first body portion 156.

Figure 5D:
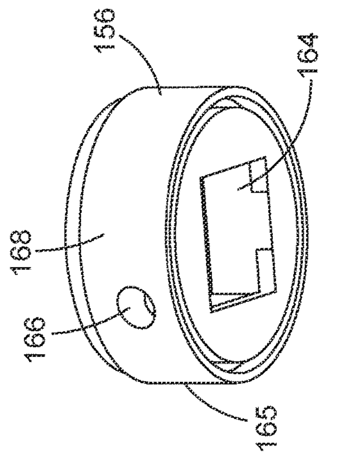
FIG. 5D is an illustration of a bottom perspective side view of a first body portion of the domed housing apparatus of FIG. 5B.

FIG. 5D is an illustration of a bottom perspective side view of the first body portion 156 of the housing apparatus 115, such as the domed housing apparatus 115*a*, of FIG. 5B. As shown in FIG. 5D, the first body portion 156 has a cut-out opening 164 configured to receive and hold the visual feedback display assembly 80 (see FIGS. 1, 7), such as the multicolor light feedback display assembly 80*a* (see FIGS. 1, 7), for example, the RGB color LED module 95 (see FIGS. 1, 7). As shown in FIG. 5D, the first body portion 156 has a cylindrical shape 165 and further has a side opening 166 formed through a wall 168 of the first body portion 156.

Figure 5E:
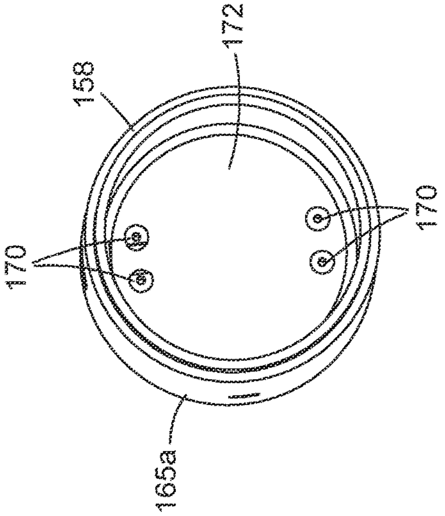
FIG. 5E is an illustration of a top perspective view of a second body portion of the domed housing apparatus of FIG. 5B.
Figure 5C:
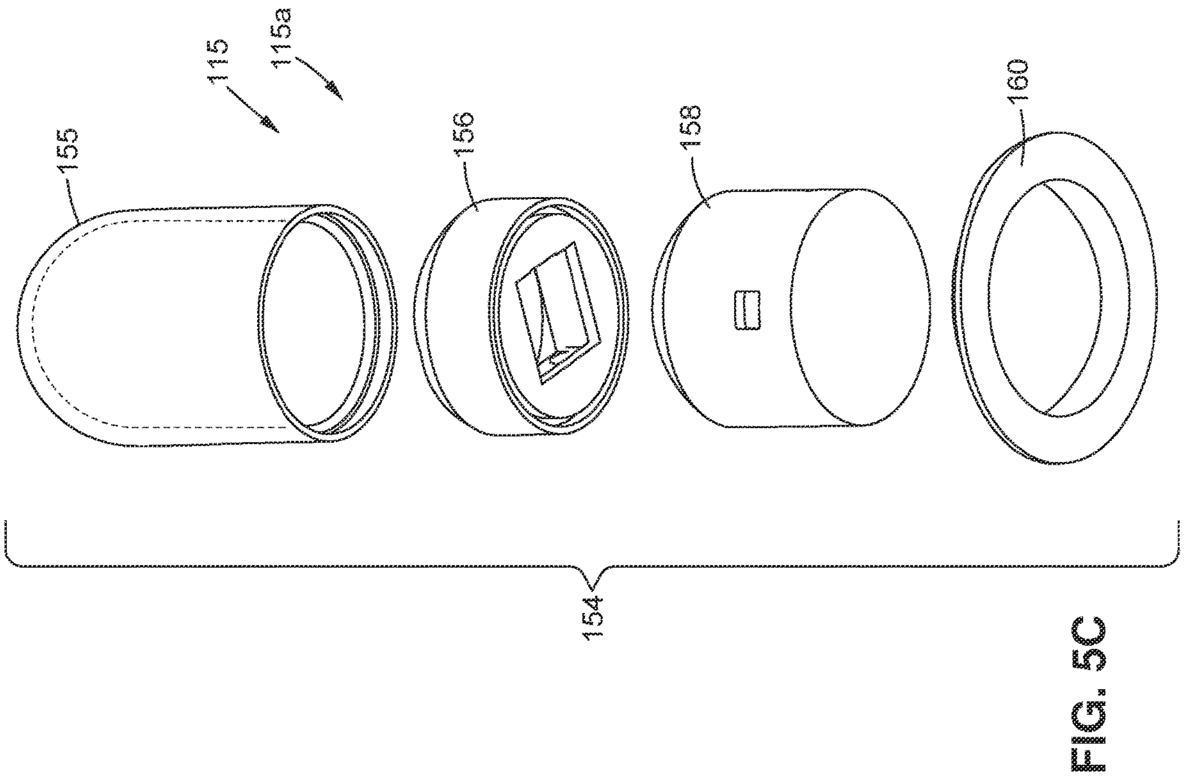
FIG. 5C is an illustration of a front bottom perspective view of the unassembled version of the domed housing apparatus of FIG. 5B.

FIG. 5E is an illustration of a top perspective view of the second body portion 158 of the housing apparatus 115, such as the domed housing apparatus 115*a*, of FIG. 5B. As shown in FIG. 5E, the second body portion 158 has four attachment points 170 formed on an interior plate 172 within the second body portion 158. Alternatively, the second body portion 158 may have one, two, three, or more than four attachment points. The four attachment points 170 are configured for attachment to a microprocessor system 70 (see FIGS. 1, 8) which is coupled within the second body portion 158. The microprocessor system 70 may be attached to the four attachment points 170, via attachment elements (not shown), such as screws, pins, or other suitable attachment elements. As further shown in FIG. 5E, the second body portion 158 has a cylindrical shape 165*a*.

Figure 5F:
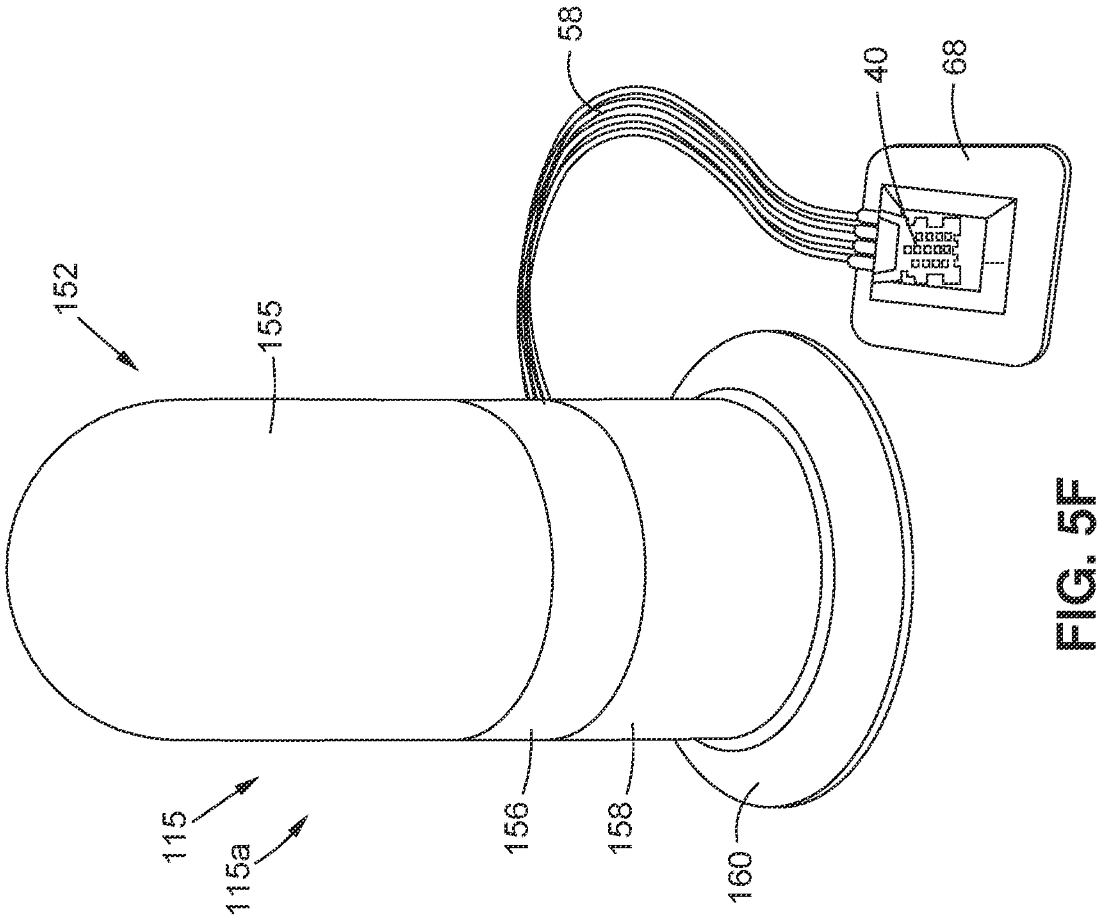
FIG. 5F is an illustration of a front perspective view of the assembled version of the domed housing apparatus of FIG. 5A attached to a sensor.

FIG. 5F is an illustration of a front perspective view of the assembled version 152 of the housing apparatus 115, such as the domed housing apparatus 115*a*, of FIG. 5A, attached to a sensor 40, via wires 58, or wiring. FIG. 5F shows the dome portion 155, the first body portion 156, the second body portion 158, and the base portion 160 of the housing apparatus 115, such as the domed housing apparatus 115*a*. FIG. 5F further shows the sensor 40 attached to a sensor enclosure 68.

Figure 6A:
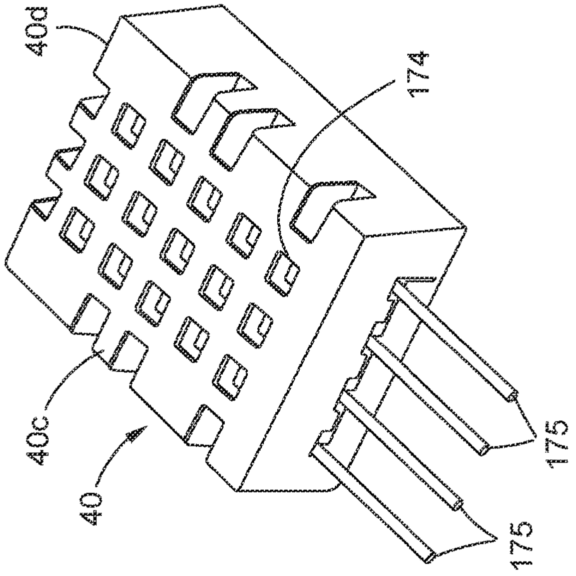
FIG. 6A is an illustration of a front perspective view of an exemplary sensor that is part of an exemplary version of an environmental monitoring system of the disclosure.

Now referring to FIG. 6A, FIG. 6A is an illustration of a front perspective view of an exemplary sensor 40, such as a combined temperature-humidity sensor 40*c*, that is part of an exemplary version of the environmental monitoring system 10 (see FIG. 1) of the disclosure. As shown in FIG. 6A, the sensor 40, such as the combined temperature-humidity sensor 40*c*, is in the form of a sensor module 40*d* having a printed circuit board (PCB) 174 attached to four pins 175. In another version, the sensor 40 has three pins or another suitable number of pins. The sensor 40, such as the combined temperature-humidity sensor 40*c*, senses the real time temperature 46 and humidity 48 through the pins 175, and in one version, may comprise a capacitive humidity sensor and a thermistor to measure the surrounding air and to transfer a digital signal to a pin 175, such as a data or communication pin. Preferably, the sensor 40 is calibrated and uses an operating supply voltage of 2.2 V (Volts) to 5.5 V (Volts) or another suitable voltage. In another version, the sensor 40, including a temperature sensor 40*a*, or the temperature sensor portion of the combined temperature-humidity sensor 40*c* may comprise a resistance temperature detector (RTD) where the resistance changes as the temperature changes, and the resistance increases as the temperature of the sensor increases, or may comprise a thermocouple. The sensor 40, including a humidity sensor 40*b*, or the humidity sensor portion of the combined temperature-humidity sensor 40*c* may comprise a resistive sensor, a thermal sensor, or a capacitive sensor. FIG. 6A shows one version of the sensor 40 that may be used in the environmental monitoring system 10. However, other suitable sensors may also be used.

Now referring to FIGS. 6B-6C, FIG. 6B is an illustration of a front perspective view of a sensor enclosure 68 for use with the sensor 40 of FIG. 6A, and FIG. 6C is an illustration of a bottom perspective view of the sensor enclosure 68 of FIG. 6B. As shown in FIGS. 6B-6C, the sensor enclosure 68 comprises a base plate 176 with a sensor enclosure portion 178 positioned in the center of the base plate 176. As shown in FIGS. 6B-6C, the sensor enclosure portion 178 has raised sides 180 and a cover portion 182 forming an opening 184. The sensor 40 (see FIG. 6A) is configured to be seated and secured within the sensor enclosure portion 178, and the pins 175 (see FIG. 6A) of the sensor 40 are configured to be inserted through the opening 184. A bottom 185 (see FIG. 6C) of the base plate 176 of the sensor enclosure 68 is configured for attachment to a surface within the interior 18 of the structure 16, such as the aircraft 22.

Now referring to FIG. 7, FIG. 7 is an illustration of a top perspective view of an exemplary RGB (red-green-blue) color light emitting diode (LED) module 95 that is part of an exemplary version of the environmental monitoring system 10 (see FIG. 1) of the disclosure. As shown in FIG. 7, the RGB color LED module 95 comprises light emitting diode (LED) color signal lights 94, including a first LED color signal light 94*a* configured to emit a red color 96, a second LED color signal light 94*b* configured to emit a green color 98, and a third LED color signal light 94*c* configured to emit a blue color 100. As shown in FIG. 7, the RGB color LED module 95 further comprises a control module 186 and a plug-in circuit board 187. The RGB color LED module 95 preferably uses a 12 volt power supply or another suitable power supply. Each LED color signal light 94 has a 10 mm (ten millimeters) LED (light emitting diode) that comprises an ultrabright LED light that burns intensely bright. The LED color signal lights 94 may have another suitable size LED. The RGB color LED module 95 further has four analog input lines and can be used without an external controller.

Figure 8:
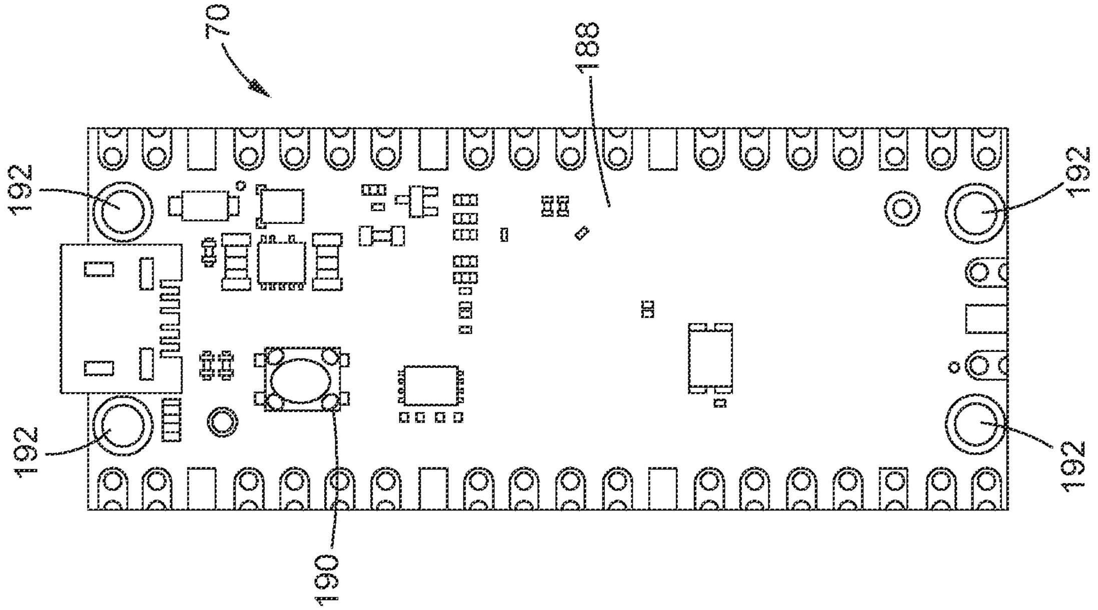
FIG. 8 is an illustration of a top view of an exemplary microprocessor system that is part of an exemplary version of an environmental monitoring system of the disclosure.

Now referring to FIG. 8, FIG. 8 is an illustration of a top view of an exemplary microprocessor system 70 that is part of an exemplary version of the environmental monitoring system 10 (see FIG. 1) of the disclosure. As shown in FIG. 8, in one version, the microprocessor system 70 comprises a circuit board 188 with external circuitry 190 and four openings 192 configured to attach to the attachment points 170 in the second body portion 158 of the housing apparatus 115, such as the domed housing apparatus 115*a*. The microprocessor system 70 preferably comprises a microcontroller chip, a processor, flash memory, multi-function microcontroller pins, power controls, and/or other suitable components.

Figure 9B:
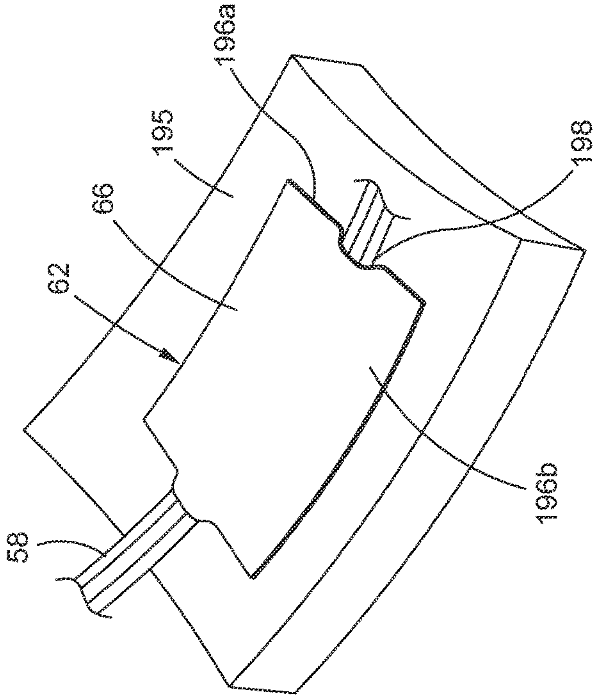
FIG. 9B is an illustration of a top perspective view of an exemplary version of a wiring shield for shielding wires connected to the sensor of FIG. 9A.
Figure 9A:
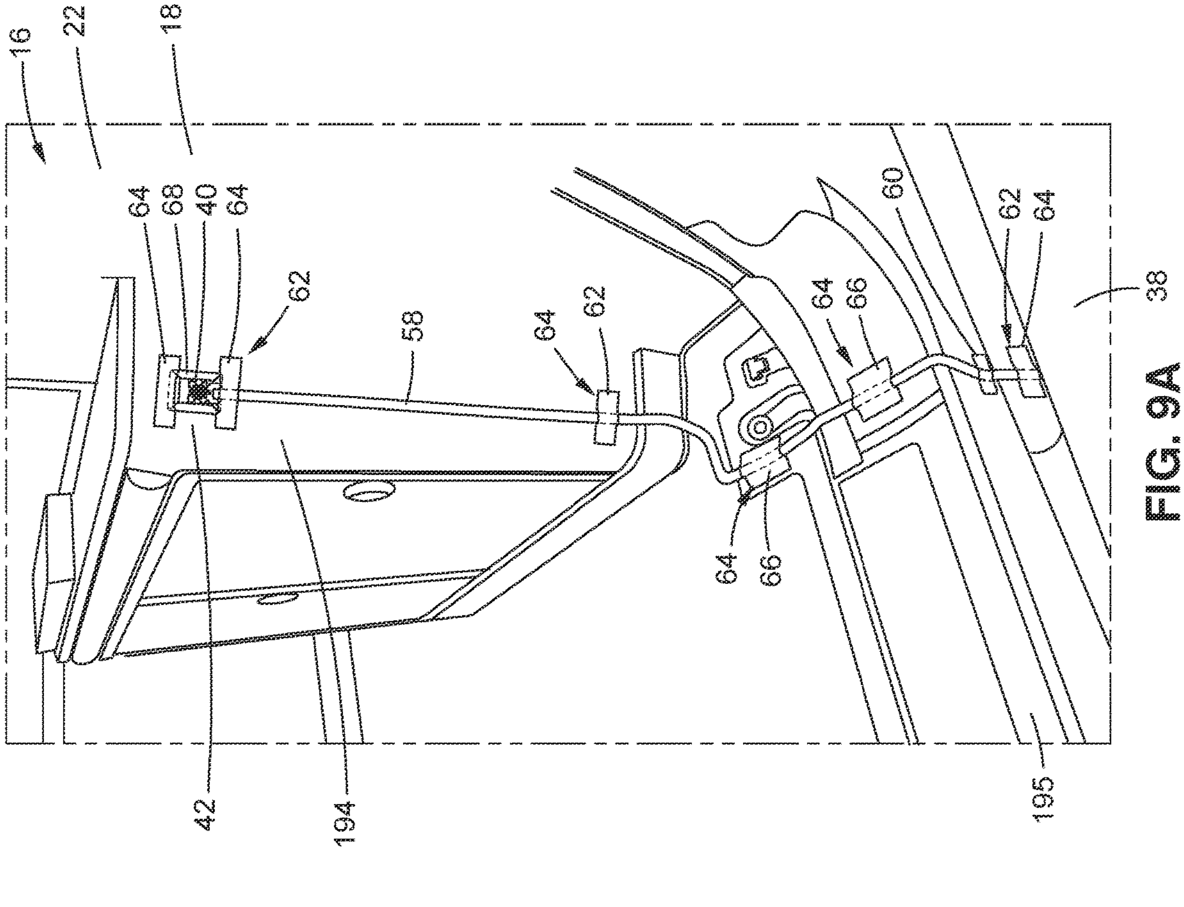
FIG. 9A is an illustration of a perspective view of an interior of an aircraft with an exemplary sensor that is part of an exemplary version of an environmental monitoring system of the disclosure.

Now referring to FIG. 9A, FIG. 9A is an illustration of a perspective view of an interior 18 of a structure 16, such as an aircraft 22, with an exemplary sensor 40 housed in a sensor enclosure 68 that is part of an exemplary version of the environmental monitoring system 10 (see FIG. 1) of the disclosure. As shown in FIG. 9A, in one version, where the structure 16 comprises the aircraft 22, the single sensor 40 is mounted in a location 42 on a cabinet 194 at a forward galley 52 in the cabin of the interior 18 of the aircraft 22, such as near plumbing for the forward galley 52. However, in other versions, the one or more sensors 40 may be mounted in other locations 42 in the interior 18 of the aircraft 22. FIG. 9A further shows wires 58 attached to the sensor 40 in the sensor enclosure 68 and extending along the cabinet 194 and along a floor 195 in the interior 18 of the aircraft 22, and extending outside the aircraft 22 at the exterior 38 of the aircraft 22. As shown in FIG. 9A, the sensor enclosure 68 and the wires 58 may be secured down with securing elements 62, such as tape 64 and one or more wiring shields 66, in the interior 18 and/or the exterior 38 of the aircraft 22. As further shown in FIG. 9A, the wires 58, or wiring, are connected to a breakaway connector 60 located at the exterior 38, or outside, the structure 16, such as the aircraft 22. The breakaway connector 60 is configured to allow the one or more wires 58, or wiring, to be easily separated.

Now referring to FIG. 9B, FIG. 9B is an illustration of a top perspective view of an exemplary securing element 62, such as the wiring shield 66, in one version, for shielding wires 58 connected to the sensor 40 and the sensor enclosure 68, of FIG. 9A. As shown in FIG. 9B, the wiring shield 66 has a bottom side 196*a* and a top side 196*b* and a central opening 198 receiving a portion of the wires 58. As shown in FIG. 9B, the bottom side 196*a* of the wiring shield 66 is coupled, or attached, to the floor 195.

Figure 9C:
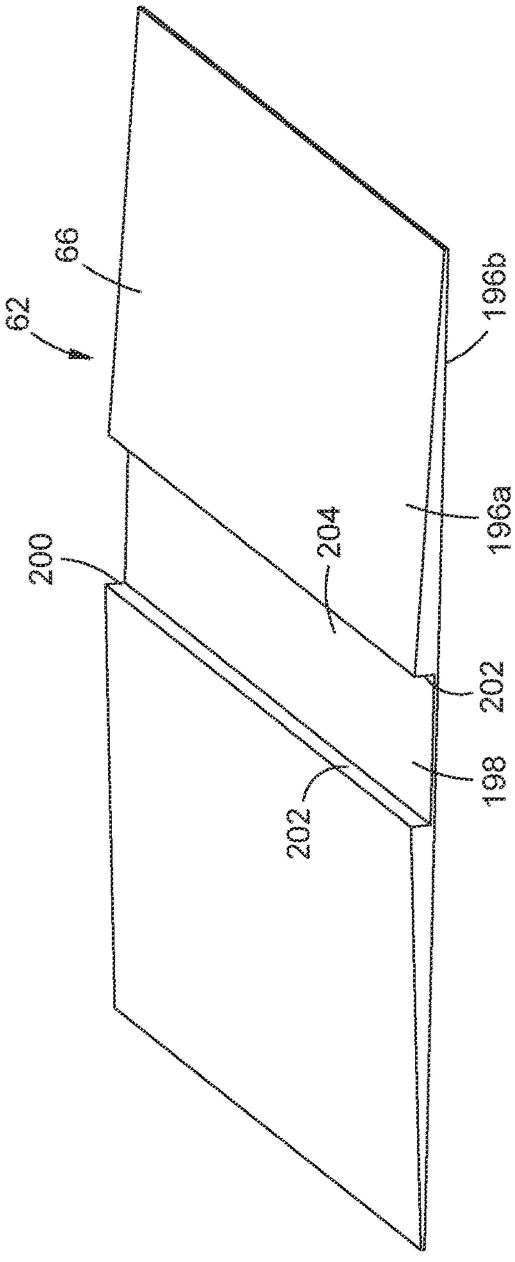
FIG. 9C is an illustration of a bottom perspective view of an exemplary version of a wiring shield.
Figure 9D:
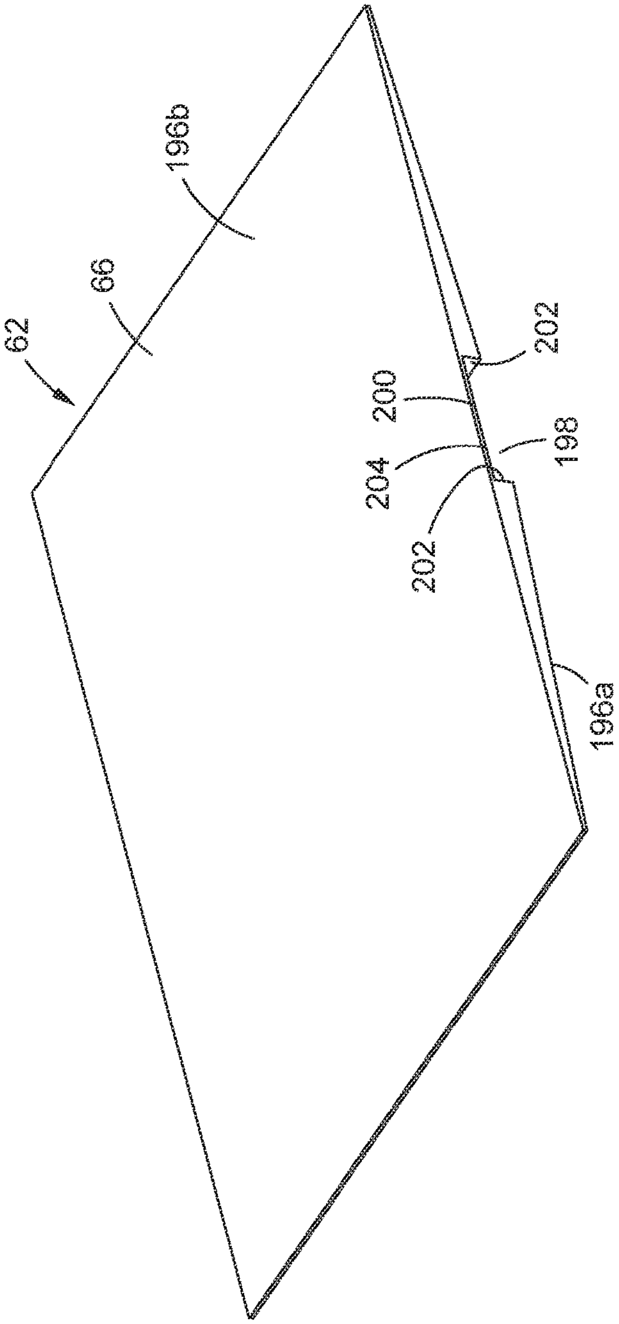
FIG. 9D is an illustration of a top perspective view of the wiring shield of FIG. 9C.

Now referring to FIGS. 9C-9D, FIG. 9C is an illustration of a bottom perspective view of an exemplary version of a securing element 62, such as a wiring shield 66, and FIG. 9D is an illustration of a top perspective view of the securing element 62, such as the wiring shield 66 of FIG. 9C. FIGS. 9C-9D show the bottom side 196*a*, the top side 196*b*, and the central opening 198 of the wiring shield 66. As further shown in FIGS. 9C-9D, the central opening 198 of the wiring shield 66 has a U-shaped configuration 200 with sides 202 and a flat channel 204. A portion of the wires 58 (see FIGS. 9A-9B) are configured to be inserted through the central opening 198 of the wiring shield 66. The wiring shield 66 is configured to protect the wires 58 and hold and secure the wires 58 in place. The wiring shield 66 may be 3D (three-dimensional) printed or may be made or manufactured with another suitable process.

Figure 10:
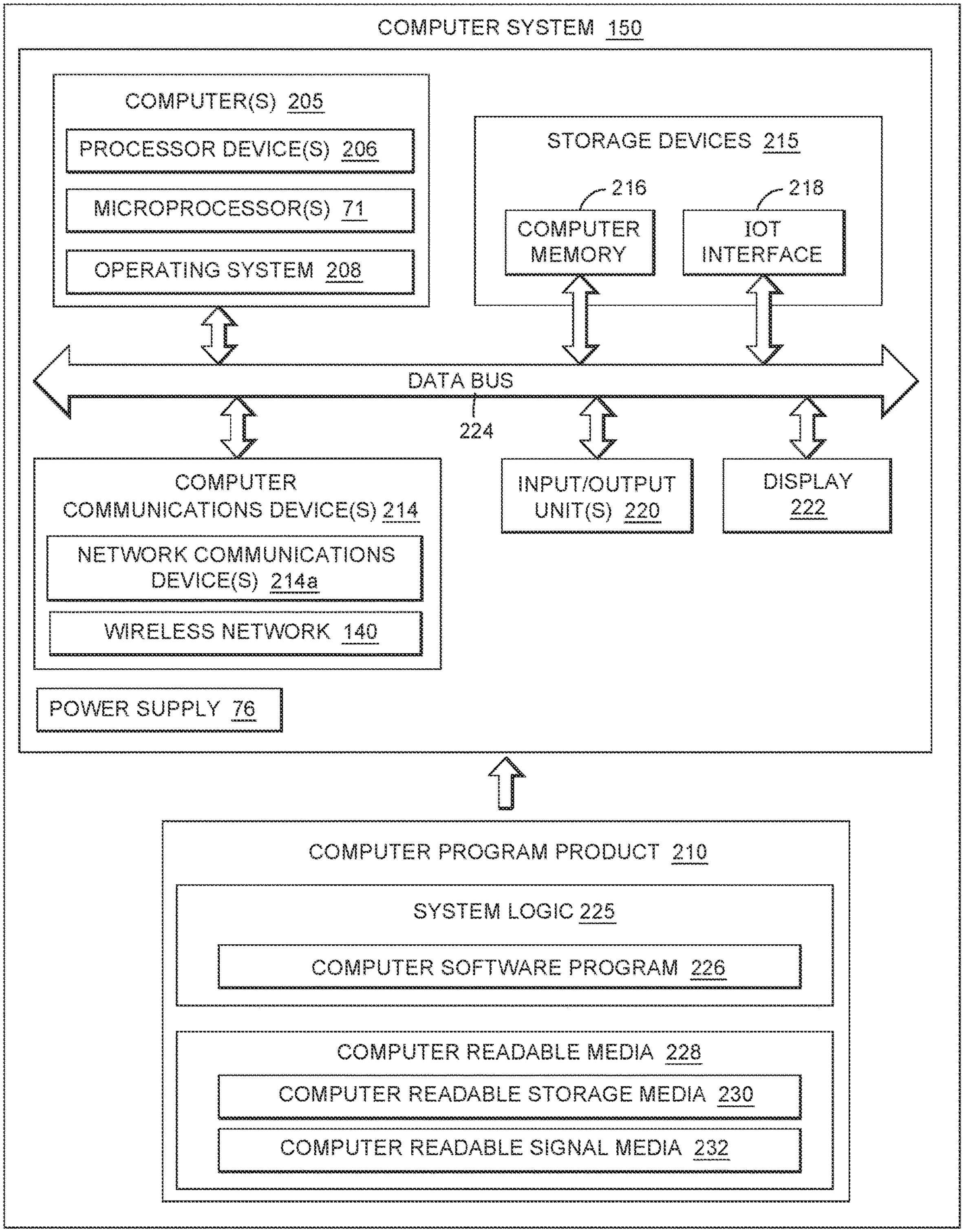
FIG. 10 is an illustration of block diagram of an exemplary version of a computer system that may be used with a version of an environmental monitoring system of the disclosure.

Now referring to FIG. 10, FIG. 10 is an illustration of block diagram of an exemplary version of the computer system 150 that may be used with the environmental monitoring system 10 (see FIG. 1), and the environmental monitoring method 250 (see FIG. 11A), and the environmental monitoring method 280 (see FIG. 11B), of the disclosure. As shown in FIG. 10, the computer system 150 comprises one or more computers 205 with one or more processor devices 206, such as one or more microprocessors 71 of the microprocessor system 70 (see FIG. 1), and an operating system 208. The computer system 150 (see FIG. 10) may be used to implement the one or more computers 205 (see FIG. 10).

The one or more computers 205 (see FIG. 10) or one or more processor devices 206 (see FIG. 10) may be configured to be used with one or more elements of the environmental monitoring system 10 (see FIG. 1) through computer program instructions, such as a computer program product 210 (see FIG. 10) stored on a computer memory 216 (see FIG. 10), accessible to the one or more computers 205 (see FIG. 10), or one or more processor devices 206 (see FIG. 10).

As shown in FIG. 10, the computer system 150 may further comprise one or more computer communications devices 214, such as networking communications devices 214*a*, for linking the environmental monitoring system 10 (see FIG. 1), for example, to one or more separate systems. The networking communications devices 214*a* (see FIG. 10) may comprise network links between various computers and devices connected together within a network data processing system via wire connections, wireless communication links, fiber optic cables, or other suitable network connections, and that may connect to a network, a server, the Internet, or another system or device.

The one or more computer communications devices 214 (see FIG. 10) may be configured to provide for communications in accordance with any of a number of wired or wireless communication standards. The one or more computers 205 (see FIG. 10) or one or more processor devices 206 (see FIG. 10) may also be configured to facilitate communications via the one or more computer communications devices 214 (see FIG. 10) by, for example, controlling hardware included within the one or more computer communications devices 214 (see FIG. 10). The one or more computer communications devices 214 (see FIG. 10) may include, for example, one or more antennas, a transmitter, a receiver, a transceiver and/or supporting hardware, including, for example, a processor for enabling communications.

As shown in FIG. 10, the computer system 150 further comprises computer storage devices 215, such as computer memory 216 and an internet of things (IOT) interface 218. The computer memory 216 (see FIG. 10) may comprise one or more of a random access memory (RAM), including dynamic and/or static RAM, on-chip or off-chip cache memory, or other suitable computer memory. The computer storage devices 215 (see FIG. 10) may comprise one or more of a flash memory, a hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage.

As shown in FIG. 10, the computer system 150 further comprises one or more input/output units 220, a display 222, a data bus 224, and a power supply 76. The one or more input/output units 220 (see FIG. 10) provide for the input and output of data with other devices connected to the computer system 150 (see FIG. 10), such as, the computer interfaces. The one or more input/output units 220 (see FIG. 10) may comprise such devices as a keyboard, a mouse, a joystick, or other input/output devices. For example, the one or more input/output units 220 (see FIG. 10) may provide a connection for user input though a keyboard and mouse, or may send output to a printer or other device.

The display 222 (see FIG. 10) provides the means to display the environmental data 44 (see FIG. 1) and/or environmental data results 44*c* (see FIG. 1), or other data or information to a user, an analyst, one or more separate automated systems, automated computer programs, automated apparatuses, or automated devices, or another suitable separate system, program, or device. As shown in FIG. 10, the data bus 224 provides communications between the one or more computers 205, the computer memory 216, the computer communications devices 214, the one or more input/output units 220, and the display 222. The power supply 76 (see FIG. 10) of the computer system 150 (see FIG. 10) may comprise batteries, electricity, solar chargers, or other power supply elements.

As shown in FIG. 10, the computer program product 210 is preferably used in the computer system 150. The computer program product 210 (see FIG. 10) comprises a system logic 225 (see FIG. 10). As shown in FIG. 10, the system logic 225 may comprise a computer software program 226.

The system logic 225 may further comprise an algorithm, program code, computer firmware, or another suitable system logic. As shown in FIG. 10, the computer program product 210 may comprise a computer readable medium 228. The computer readable medium 228 (see FIG. 10) may comprise computer readable storage media 230 (see FIG. 10), computer readable signal media 232 (see FIG. 10), or another suitable computer readable medium.

The system logic 225 (see FIG. 10) may be stored in and retrieved from the computer readable storage media 230 (see FIG. 10) and loaded into the one or more computers 205 (see FIG. 10), the one or more processor devices 206, or other programmable device, to configure and direct the one or more computers 205, the one or more processor devices 206, or other programmable device to execute operations to be performed on or by the one or more computers 205, the one or more processor devices 206, or other programmable device, and to function in a particular way. Execution of the system logic 225 (see FIG. 10) may produce a computer-implemented system, process or method, such that the system logic 225 executed by the one or more computers 205 (see FIG. 10), one or more processor devices 206 (see FIG. 10), or other programmable device provide operations for implementing the functions disclosed herein.

Figure 11A:
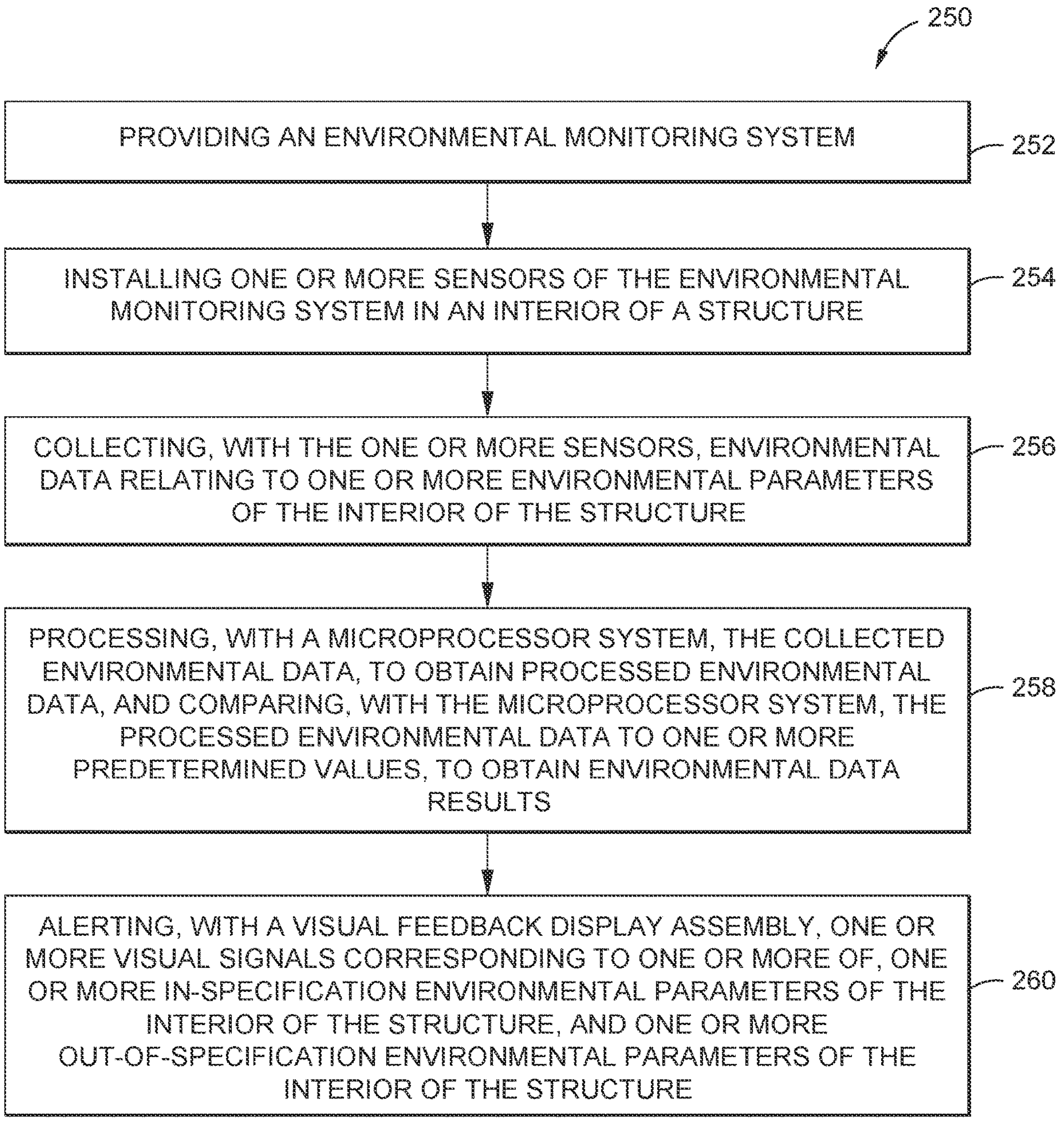
FIG. 11A is an illustration of a flow diagram of an exemplary version of an environmental monitoring method of the disclosure.

Now referring to FIG. 11A, FIG. 11A is an illustration of a flow diagram of an exemplary version of an environmental monitoring method 250 of the disclosure. In another version of the disclosure, there is provided the environmental monitoring method 250 for real time monitoring 12 (see FIG. 1) of one or more environmental parameters 14 (see FIG. 1) in an interior 18 (see FIG. 1) of a structure 16 (see FIG. 1). The structure 16 has the interior 18 and the exterior 38 (see FIG. 1). Where the structure comprises an aircraft 22, the interior 18 of the aircraft 22 that may be monitored by the environmental monitoring system 10 includes one or more of, a cabin, a cargo hold, a cockpit, a fuel tank, a jet engine interior, or another suitable interior area of the aircraft 22.

The blocks in FIG. 11A represent operations and/or portions thereof, or elements, and lines connecting the various blocks do not imply any particular order or dependency of the operations or portions thereof, or elements. FIG. 11A and the disclosure of the steps of the environmental monitoring method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 11A, the environmental monitoring method 250 comprises the step of providing 252 the environmental monitoring system 10 (see FIG. 1). The environmental monitoring system 10, as discussed in detail above, comprises the microprocessor system 70 (see FIG. 1), one or more sensors 40 (see FIG. 1) connected to the microprocessor system 70, the power supply 76 (see FIG. 1), supplying power 78 (see FIG. 1), coupled to the microprocessor system 70, the one or more sensors 40, and/or the visual feedback display assembly 80 (see FIG. 1), and the visual feedback display assembly 80 (see FIG. 1) coupled to the microprocessor system 70. The step of providing 252 the environmental monitoring system 10 may further comprise enclosing the one or more sensors 40 of the environmental monitoring system 10 in a sensor enclosure 68 (see FIGS. 6B-6C), and securing the one or more sensors 40 in the sensor enclosure 68 to an interior portion in the interior 18 of the structure 16, such as the aircraft 22, via one or more securing elements 62 (see FIGS. 1, 9A), such as tape 64 (see FIG. 9A), or another suitable securing element.

The step of providing 252 the environmental monitoring system 10 further comprises, providing the environmental monitoring system 10 comprising the visual feedback display assembly 80 (see FIG. 1) comprising a multicolor light feedback display assembly 80*a* (see FIG. 1) mounted, in one version, at the exterior 38 of the structure 16. In another version, the visual feedback display assembly 80 is located in the interior 18 of the structure 16. The visual feedback display assembly 80, such as the multicolor light feedback display assembly 80*a*, has the plurality of light emitting diode (LED) color signal lights 94 (see FIG. 1) corresponding to the one or more environmental parameters 14, or conditions, of the interior 18 of the structure 16, such as the air 45 in the interior 18 of the structure 16.

The step of providing 252 the environmental monitoring system 10 comprising the visual feedback display assembly 80 may further comprise providing the plurality of light emitting diode (LED) color signal lights 94 housed in a housing apparatus 115 (see FIGS. 1, 5A), such as a domed housing apparatus 115*a* (see FIG. 1, 5A).

The step of providing 252 the environmental monitoring system 10 comprising the visual feedback display assembly 80 may further comprise providing the plurality of light emitting diode (LED) color signal lights 94 having one or more colors 93 (see FIG. 1) comprising, a green color 98 (see FIG. 1), to indicate the one or more in-specification environmental parameters 14*a* (see FIG. 1), and a blue color 100 (see FIG. 1), a red color 96 (see FIG. 1), a yellow color 102 (see FIG. 1), and a purple color 104 (see FIG. 1), each indicating one of the one or more out-of-specification environmental parameters 14*b* (see FIG. 1), or conditions, or events.

The step of providing 252 the environmental monitoring system 10 may further comprise providing the environmental monitoring system 10 comprising one or more of, a global positioning system (GPS) 126 (see FIG. 1), to provide a global positioning system (GPS) location 128 (see FIG. 1) of the structure 16; a motion detector device 130 (see FIG. 1), to sense if the structure 16 is in motion 132, or moved; an interface 134 (see FIG. 1) for a collective network 135 (see FIG. 1) of connected devices 136 (see FIG. 1) and technology that facilitates communication between the connected devices 136, such as the internet of things (IOT), to provide remote monitoring 114 (see FIG. 1) on a remote device 138 (see FIG. 1); a wireless network 140 (see FIG. 1) to allow the environmental data 44 to be collected remotely; a short-range wireless technology 142 (see FIG. 1), to exchange the environmental data results 44*c* (see FIG. 1) between fixed devices 144 (see FIG. 1) and mobile devices 145 (see FIG. 1), such as cell phones 146 (see FIG. 1), or another suitable device or apparatus.

The step of providing 252 the environmental monitoring system 10 may further comprise providing the environmental monitoring system 10 in the interior 18 of the structure 16, and alerting, to a mobile device 145 (see FIG. 1) outside of the structure 16 one or more of the one or more out-of-specification environmental parameters 14*b* (see FIG. 1).

As shown in FIG. 11A, the environmental monitoring method 250 further comprises the step of installing 254 the one or more sensors 40 of the environmental monitoring system 10 in the interior 18 of the structure 16.

As shown in FIG. 11A, the environmental monitoring method 250 further comprises the step of collecting 256, with the one or more sensors 40, environmental data 44 (see FIG. 1) relating to one or more environmental parameters 14 of the interior 18 of the structure 16, to obtain collected environmental data 44*a*.

The step of collecting 256, with the one or more sensors 40, the environmental data 44 relating to the one or more environmental parameters 14 further comprises, collecting, with the one or more sensors 40, the environmental data 44 relating to the one or more environmental parameters 14, as shown in FIG. 1, comprising, a temperature 46 of the interior 18 of the structure 16, a humidity 48 of the interior 18 of the structure 16, and a dew point 50 of the interior 18 of the structure 16 calculated based on the temperature 46 and the humidity 48.

The step of collecting 256, with the one or more sensors 40, the environmental data 44 relating to the one or more environmental parameters 14 of the interior 18 of the structure 16 further comprises, collecting the environmental data 44 of the interior 18 of the structure 16, where the structure 16 comprises, as shown in FIG. 1, one of, a vehicle 20, including an aircraft 22, a travel trailer 24, a rotorcraft 25, a watercraft 26, a train 28, a truck 30, or a building 32, including a dwelling structure 34, or a warehouse 35, or another suitable structure.

As shown in FIG. 11A, the environmental monitoring method 250 further comprises the step of processing 258, with the microprocessor system 70 (see FIG. 1) of the environmental monitoring system 10, the collected environmental data 44*a* (see FIG. 1), to obtain processed environmental data 44*b* (see FIG. 1), and comparing, with the microprocessor system 70, the processed environmental data 44*b* to one or more predetermined values 72 (see FIG. 1), to obtain environmental data results 44*c* (see FIG. 1).

As shown in FIG. 11A, the environmental monitoring method 250 further comprises the step of alerting 260, with the visual feedback display assembly 80, one or more visual signals 84 (see FIG. 1) corresponding to one or more of, one or more in-specification environmental parameters 14*a* of the interior 18 of the structure 16, and one or more out-of-specification environmental parameter 14*b* of the interior 18 of the structure 16.

Figure 11B:
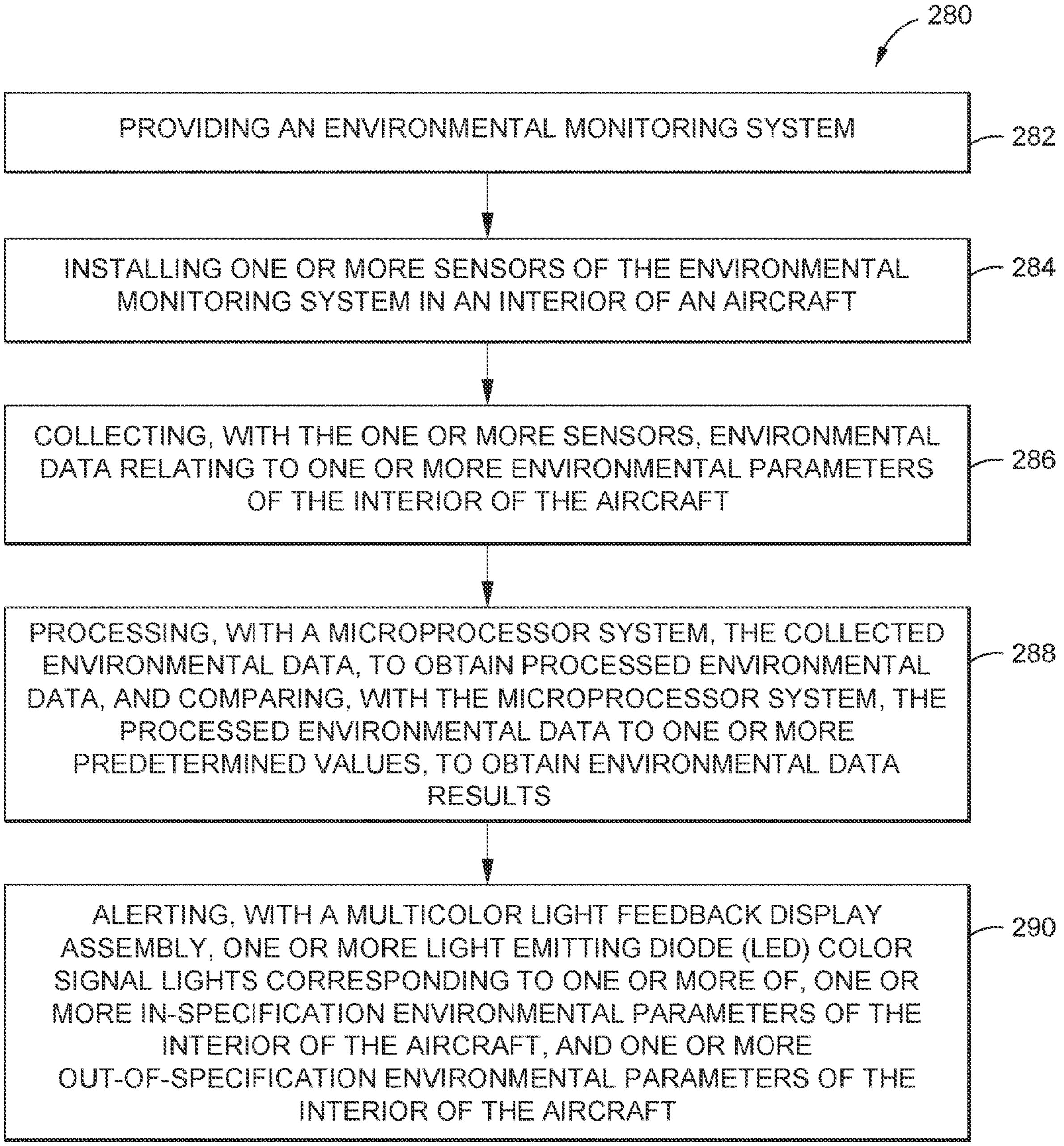
FIG. 11B is an illustration of a flow diagram of another exemplary version of an environmental monitoring method of the disclosure.

Now referring to FIG. 11B, FIG. 11B is an illustration of a flow diagram of an exemplary version of an environmental monitoring method 280 of the disclosure. In another version of the disclosure, there is provided the environmental monitoring method 280 for real time monitoring 12 (see FIG. 1) of one or more environmental parameters 14 (see FIG. 1) in an interior 18 (see FIG. 1) of an aircraft 22 (see FIG. 1). The structure 16 has the interior 18 and the exterior 38 (see FIG. 1). Where the structure comprises the aircraft 22, the interior 18 of the aircraft 22 that may be monitored by the environmental monitoring system 10 includes one or more of, a cabin, a cargo hold, a cockpit, a fuel tank, a jet engine interior, or another suitable interior area of the aircraft 22.

The blocks in FIG. 11B represent operations and/or portions thereof, or elements, and lines connecting the various blocks do not imply any particular order or dependency of the operations or portions thereof, or elements. FIG. 11B and the disclosure of the steps of the environmental monitoring method 280 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 11B, the environmental monitoring method 280 comprises the step of providing 282 the environmental monitoring system 10 (see FIG. 1). The environmental monitoring system 10, as discussed in detail above, comprises the microprocessor system 70 (see FIG. 1), one or more sensors 40 (see FIG. 1) connected to the microprocessor system 70, a power supply 76 (see FIG. 1) with power 78 (see FIG. 1) coupled to the microprocessor system 70, and/or the one or more sensors 40, and/or the multicolor light feedback display assembly 80*a*, and the environmental monitoring system 10 further comprising the multicolor light feedback display assembly 80*a* (see FIG. 1) coupled to the microprocessor system 70.

The step of providing 282 the environmental monitoring system 10 may further comprise providing the environmental monitoring system 10 comprising the multicolor light feedback display assembly 80*a* (see FIG. 2) further comprising, mounting the multicolor light feedback display assembly 80*a* to a mounting ring 118 (see FIG. 2) on a nosewheel anchor block 122 (see FIG. 2) positioned in front of a nose 124 (see FIG. 2) of the aircraft 22 (see FIG. 2).

The step of providing 282 the environmental monitoring system 10 comprising the multicolor light feedback display assembly 80*a* may further comprise providing the plurality of light emitting diode (LED) color signal lights 94 housed in a housing apparatus 115 (see FIGS. 1, 5A), such as a domed housing apparatus 115*a* (see FIGS. 1, 5A).

The step of providing 282 the environmental monitoring system 10 comprising the multicolor light feedback display assembly 80*a* may further comprise providing one or more light emitting diode (LED) color signal lights 94 emitting colors 93, as shown in FIG. 1, comprising, a green color 98 to indicate the one or more in-specification environmental parameters 14*a*, and a blue color 100, a red color 96, a yellow color 102, and a purple color 104, each indicating one of the one or more out-of-specification environmental parameters 14*b*.

The step of providing 282 the environmental monitoring system 10 may further comprise providing the environmental monitoring system 10 comprising one or more of, a global positioning system (GPS) 126 (see FIG. 1), to provide a global positioning system (GPS) location 128 (see FIG. 1) of the structure 16; a motion detector device 130 (see FIG. 1), to sense if the structure 16 is in motion 132, or moved; an interface 134 (see FIG. 1) for a collective network 135 (see FIG. 1) of connected devices 136 (see FIG. 1) and technology that facilitates communication between the connected devices 136, such as the internet of things (IOT), to provide remote monitoring 114 (see FIG. 1) on a remote device 138 (see FIG. 1); a wireless network 140 (see FIG. 1) to allow the environmental data 44 to be collected remotely; a short-range wireless technology 142 (see FIG. 1), to exchange the environmental data results 44*c* (see FIG. 1) between fixed devices 144 (see FIG. 1) and mobile devices 145 (see FIG. 1), such as cell phones 146 (see FIG. 1), or another suitable device or apparatus.

The step of providing 282 the environmental monitoring system 10 may further comprise providing the environmental monitoring system 10 in the interior 18 of the aircraft 22, and alerting, to a mobile device 145 outside of the aircraft 22 one or more of the one or more out-of-specification environmental parameters 14*b*.

The step of providing 282 the environmental monitoring system 10 may further comprise enclosing the one or more sensors 40 of the environmental monitoring system 10 in a sensor enclosure 68 (see FIGS. 6B-6C), and securing the one or more sensors 40 in the sensor enclosure 68 to an interior portion in the interior 18 of the aircraft 22, via one or more securing elements 62 (see FIGS. 1, 9A), such as tape 64 (see FIG. 9A), or another suitable securing element.

As shown in FIG. 11B, the environmental monitoring method 280 further comprises the step of installing 284 the one or more sensors 40 of the environmental monitoring system 10 in the interior 18 of the aircraft 22.

As shown in FIG. 11B, the environmental monitoring method 280 further comprises the step of collecting 286, with the one or more sensors 40, environmental data 44 (see FIG. 1) relating to one or more environmental parameters 14 (see FIG. 1) of the interior 18 of the aircraft 22, to obtain collected environmental data 44*a* (see FIG. 1). The one or more environmental parameters 14 comprise one or more of, a temperature 46 (see FIG. 1) of the interior 18 of the aircraft 22, a humidity 48 (see FIG. 1) of the interior 18 of the aircraft 22, and a dew point 50 (see FIG. 1) of the interior 18 of the aircraft 22 calculated based on the temperature 46 and the humidity 48.

As shown in FIG. 11B, the environmental monitoring method 280 further comprises the step of processing 288, with the microprocessor system 70 (see FIG. 1) of the environmental monitoring system 10, the collected environmental data 44*a*, to obtain processed environmental data 44*b* (see FIG. 1), and comparing, with the microprocessor system 70, the processed environmental data 44*b* to one or more predetermined values 72 (see FIG. 1), to obtain environmental data results 44*c* (see FIG. 1).

As shown in FIG. 11B, the environmental monitoring method 280 further comprises the step of alerting 290, with the multicolor light feedback display assembly 80*a*, one or more light emitting diode (LED) color signal lights 94 corresponding to one or more of, one or more in-specification environmental parameters 14*a* of the interior 18 of the aircraft 22, and one or more out-of-specification environmental parameters 14*b* of the interior 18 of the aircraft 22.

Figure 12:
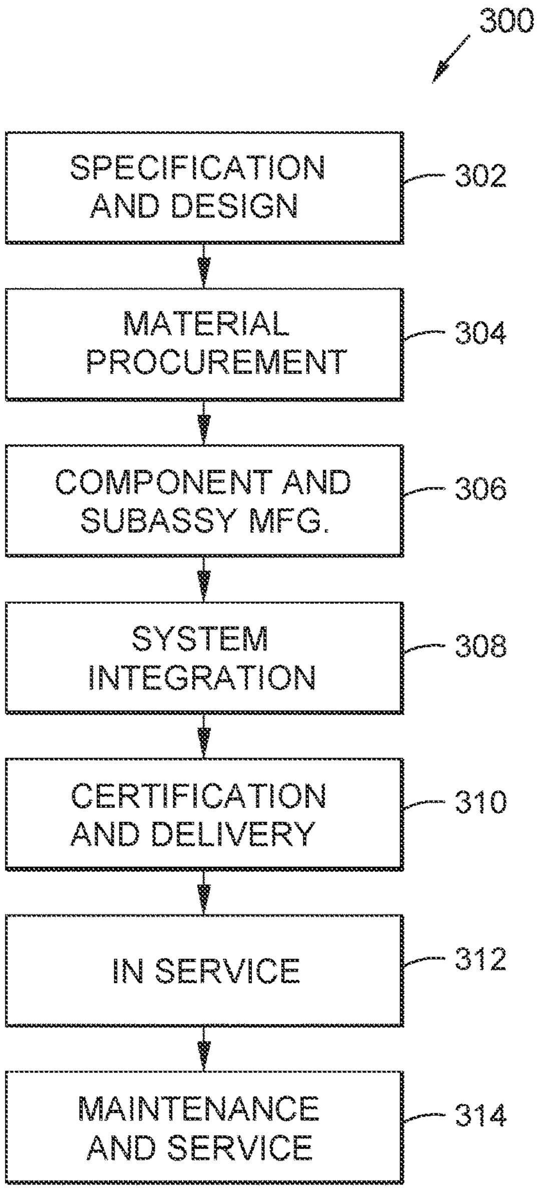
FIG. 12 is an illustration of a flow diagram of an exemplary aircraft manufacturing and service method.
Figure 13:
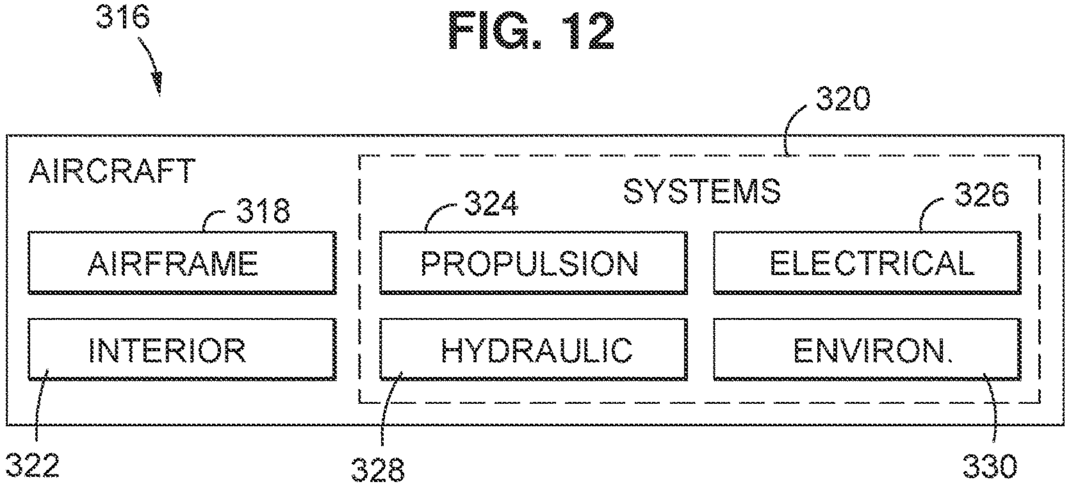
FIG. 13 is an illustration of an exemplary block diagram of an aircraft.

Now referring to FIGS. 12 and 13, FIG. 12 is an illustration of a flow diagram of an exemplary aircraft manufacturing and service method 300, and FIG. 13 is an illustration of an exemplary block diagram of an aircraft 316. Referring to FIGS. 12 and 13, versions of the disclosure may be described in the context of the aircraft manufacturing and service method 300 as shown in FIG. 13, and the aircraft 316 as shown in FIG. 13.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 13, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as automotive. Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the environmental monitoring system 10 (see FIG. 1), the environmental monitoring method 250 (see FIG. 11A), and the environmental monitoring method 280 (see FIG. 11B) provide for a temperature and humidity monitoring system 10*a* (see FIG. 1) for real time monitoring 12 (see FIG. 1) of the interior 18 (see FIG. 1) of a structure 16, such as an aircraft 22 (see FIG. 1) that is in short term storage or long term storage, or grounded for a set period of time, or out of service. In one version, visual feedback display assembly 80 (see FIG. 1) is mounted on a mounting structure 120 (see FIG. 2) exterior 38 to the structure 16, such as the aircraft 22 and one or more sensors 40 are positioned in an interior 18 (see FIG. 1) of the structure 16, such as the aircraft 22. In another version, the environmental monitoring system 10 is positioned in the interior 18 of the structure 16, such as the aircraft 22, and the alert signals 82 for any out-of-specification environmental parameters 14*b* (see FIG. 1) may be sent to a remote device 138 (see FIG. 1), such as a mobile device 145 (see FIG. 1), for example, a cell phone 146 (see FIG. 1). The environmental monitoring system 10 has one or more sensors 40 connected to a microprocessor system 70 (see FIG. 1), which gathers environmental data 44 (see FIG. 1), including temperature 46, humidity 48, and dew point 50, for the interior 18 of the structure 16, such as the aircraft 22. The microprocessor system 70 compares processed environmental data 44*b* (see FIG. 1) to one or more predetermined values 72 (see FIG. 1), to obtain environmental data results 44*c* (see FIG. 1). If an out-of-specification environmental parameter 14*b*, or condition, or event occurs, an alert signal 82 (see FIG. 1), such as visual signal 84 (see FIG. 1), an audio signal 86, or a radio frequency (RF) signal 88, alerts a user of the out-of-specification environmental parameter 14*b*, or condition, or event, for example, for a visual signal 84, one or more light emitting diode (LED) color signal lights 94 with various colors 93 (see FIG. 1) corresponding to the out-of-specification environmental parameter 14*b* will be illuminated. The one or more light emitting diode (LED) color signal lights 94 housed in a domed housing apparatus 115*a* (see FIG. 5A) may be seen by a user, an inspector, or a maintenance crew, or may be monitored on a remote device 138 (see FIG. 1). If the structure 16, such as the aircraft 22, is going to be parked for more than a week, the environmental monitoring system 10 may be used. The environmental monitoring system 10 may be used on a short-term basis, if the aircraft 22 is parked for a short period of time, i.e., greater than a week, or the environmental monitoring system 10 may be used for aircraft 22 that are out of service for long terms or long periods of time.

In addition, disclosed versions of the environmental monitoring system 10 (see FIG. 1), the environmental monitoring method 250 (see FIG. 11A), and the environmental monitoring method 280 (see FIG. 11B) allow for real time monitoring 12 of the interior 18 of the structure 16, such as the aircraft 22, for example, a sealed aircraft 22*a* (see FIG. 1), without having to break or unseal the seals to enter the sealed aircraft 22*a*, and then having to reseal the sealed aircraft 22*a* before leaving. Thus, time and labor costs may be decreased. The environmental monitoring system 10 provides valuable information to attending mechanics, inspectors, maintenance crews, and other users about the sealed interior 18*a* (see FIG. 1) of the sealed aircraft 22*a*. Further, disclosed versions of the environmental monitoring system 10 (see FIG. 1), the environmental monitoring method 250 (see FIG. 11A), and the environmental monitoring method 280 (see FIG. 11B) are simple to use, simple to make with three-dimensional (3D) printing or other manufacturing processes, and simple to assemble. Further, the multicolor light feedback display assembly 80*a* provides instant information from long distances without the need to open the structure 16, for example, the aircraft 22, such as the sealed aircraft 22*a*. The environmental monitoring system 10 provides for real time monitoring 12 of environmental parameters 14, such as temperature 46, humidity 48, and dew point 50, in the interior 18 of the structure 16, such as the aircraft 22, for example, of the air 45 in the interior 18 of stored aircraft 22. Further, the environmental monitoring system 10 may be used with various optional features 125 (see FIG. 1), such as one or more of, a global positioning system (GPS) 126 (see FIG. 1), to provide a global positioning system (GPS) location 128 (see FIG. 1) of the structure 16; a motion detector device 130 (see FIG. 1), to sense if the structure 16 is in motion 132, or moved; an interface 134 (see FIG. 1) for a collective network 135 (see FIG. 1) of connected devices 136 (see FIG. 1) and technology that facilitates communication between the connected devices 136, such as the internet of things (IOT), to provide remote monitoring 114 (see FIG. 1) on a remote device 138 (see FIG. 1); a wireless network 140 (see FIG. 1) to allow the environmental data 44 to be collected remotely; a short-range wireless technology 142 (see FIG. 1), to exchange the environmental data results 44*c* (see FIG. 1) between fixed devices 144 (see FIG. 1) and mobile devices 145 (see FIG. 1), such as cell phones 146 (see FIG. 1), or another suitable device or apparatus.

Moreover, disclosed versions of the environmental monitoring system 10 (see FIG. 1), the environmental monitoring method 250 (see FIG. 11A), and the environmental monitoring method 280 (see FIG. 11B) avoid having to use a data logger system to monitor the temperature 46 of an interior 18 of a sealed aircraft 22*a* that is in long term storage or short term storage, and thus avoid unsealing and resealing of the aircraft 22 to collect the temperature data. In addition, disclosed versions of the environmental monitoring system 10 (see FIG. 1), the environmental monitoring method 250 (see FIG. 11A), and the environmental monitoring method 280 (see FIG. 11B) avoid the use of humidity indicator cards to monitor the humidity 48 of an interior 18 of a sealed aircraft 22*a* that is in long term storage or short term storage, and thus avoid unsealing and resealing of the aircraft 22 to collect the humidity data.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. An environmental monitoring method for real time monitoring of one or more environmental parameters in an interior of a structure comprising an aircraft, or a rotorcraft, the structure being on ground, the environmental monitoring method comprising the steps of:

providing an environmental monitoring system comprising:
- a microprocessor system comprising at least a circuit board with external circuitry, a microcontroller chip, and a processor;
- one or more sensors connected to the microprocessor system, the one or more sensors comprising one or more of:
  - a temperature sensor for measuring a temperature of air in the interior of the structure, the structure comprising the aircraft, or the rotorcraft, the structure being on the ground;
  - a humidity sensor for measuring a humidity of the air in the interior of the structure; and
  - a combined temperature-humidity sensor for measuring the temperature and the humidity of the air in the interior of the structure;
- a power supply coupled to the microprocessor system; and
- a visual feedback display assembly coupled to the microprocessor system;

installing the one or more sensors of the environmental monitoring system in the interior of the structure;

transferring, from the one or more sensors to the microprocessor system, signals of environmental data relating to the one or more environmental parameters of the interior of the structure on the ground, to obtain collected environmental data, the one or more environmental parameters comprising one or more of:
- the temperature of the air in the interior of the structure;
- the humidity of the air in the interior of the structure; and
- a dew point of the air in the interior of the structure;

processing, with the microprocessor system of the environmental monitoring system, the collected environmental data, to obtain processed environmental data, the processed environmental data comprising one or more of:
- the temperature of the air in the interior of the structure measured in degrees Fahrenheit;
- the humidity of the air in the interior of the structure measured as a relative humidity as a percentage from 0 to 100; and a calculated dew point of the air in the interior of the structure calculated based on the temperature and the humidity;

comparing, with the microprocessor system, the processed environmental data to one or more predetermined values, to obtain environmental data results, the one or more predetermined values comprising one or more of:

a predetermined temperature range between 40 degrees Fahrenheit and 80 degrees Fahrenheit;

a predetermined humidity range of 60 percent humidity and below; and a calculated dew point threshold; and alerting, with the visual feedback display assembly, based on the environmental data results, one or more light emitting diode (LED) color signal lights corresponding to one or more of, one or more in-specification environmental parameters of the interior of the structure, and one or more out-of-specification environmental parameters of the interior of the structure, wherein the one or more light emitting diode (LED) color signal lights comprise one or more of:

a green color to indicate the one or more in-specification environmental parameters; and a red color, a blue color, a yellow color, and a purple color, each indicating one of the one or more out-of-specification environmental parameters.

2. The environmental monitoring method of claim 1, wherein the step of providing the environmental monitoring system further comprises, providing the environmental monitoring system comprising the visual feedback display assembly comprising:

a multicolor light feedback display assembly mounted exterior to the structure, the multicolor light feedback display assembly having a plurality of light emitting diode (LED) color signal lights corresponding to the one or more environmental parameters of the interior of the structure.

3. The environmental monitoring method of claim 2, wherein the step of providing the environmental monitoring system comprising the visual feedback display assembly further comprises, providing the plurality of light emitting diode (LED) color signal lights housed in a domed housing apparatus.

4. The environmental monitoring method of claim 2, wherein the step of providing the environmental monitoring system comprising the visual feedback display assembly further comprises, providing the plurality of light emitting diode (LED) color signal lights comprising:

the blue color to indicate the one of the one or more out-of-specification environmental parameters comprising the temperature outside the predetermined temperature range, where the temperature is below 40 degrees Fahrenheit;

the red color to indicate the one of the one or more out-of-specification environmental parameters comprising the temperature outside the predetermined temperature range, where the temperature is above 80 degrees Fahrenheit;

the yellow color to indicate the one of the one or more out-of-specification environmental parameters comprising the humidity outside the predetermined humidity range, where the humidity is above 60 percent humidity; and the purple color to indicate the one of the one or more out-of-specification environmental parameters comprising the dew point outside the calculated dew point threshold.

5. The environmental monitoring method of claim 1, wherein the step of providing the environmental monitoring system in the interior of the structure comprising the aircraft further comprises, providing the environmental monitoring system comprising a multicolor light feedback display assembly comprising:

mounting the multicolor light feedback display assembly to a mounting ring on a nosewheel anchor block positioned in front of a nose of the aircraft.

6. The environmental monitoring method of claim 1, wherein the step of providing the environmental monitoring system further comprises, providing the environmental monitoring system comprising one or more of:

a global positioning system (GPS), to provide a global positioning system (GPS) location of the structure;

a motion detector device, to sense a motion of the structure;

an interface for a collective network of connected devices that facilitates communication between the connected devices, to provide remote monitoring on a remote device;

a wireless network, to allow the environmental data to be collected remotely; and a short-range wireless technology, to exchange the environmental data results between fixed devices and mobile devices.

7. The environmental monitoring method of claim 1, wherein the step of providing the environmental monitoring system further comprises, providing the environmental monitoring system in the interior of the structure, and alerting, to a mobile device outside of the structure one or more of the one or more out-of-specification environmental parameters.

8. The environmental monitoring method of claim 1, wherein the step of providing the environmental monitoring system further comprises, providing the environmental monitoring system comprising the one or more sensors connected to the microprocessor system, and enclosing the one or more sensors in a sensor enclosure, and attaching the sensor enclosure to a surface within the interior of the structure.

9. An environmental monitoring method for real time monitoring of one or more environmental parameters in an interior of an aircraft, the aircraft being on ground, the environmental monitoring method comprising the steps of:

providing an environmental monitoring system comprising:

a microprocessor system comprising at least a circuit board with external circuitry, a microcontroller chip, and a processor;

one or more sensors connected to the microprocessor system, the one or more sensors comprising one or more of:

a temperature sensor for measuring a temperature of air in the interior of the aircraft;

a humidity sensor for measuring a humidity of the air in the interior of the aircraft; and a combined temperature-humidity sensor for measuring the temperature and the humidity of the air in the interior of the aircraft;

a power supply coupled to the microprocessor system; and a multicolor light feedback display assembly coupled to the microprocessor system and mounted exterior to the aircraft on the ground;

installing the one or more sensors of the environmental monitoring system in the interior of the aircraft;

transferring, from the one or more sensors to the microprocessor system, signals of environmental data relating to the one or more environmental parameters of the interior of the aircraft on the ground, to obtain collected environmental data, the one or more environmental parameters comprising one or more of:

the temperature of the air in the interior of the aircraft;

the humidity of the air in the interior of the aircraft; and a dew point of the air in the interior of the aircraft calculated based on the temperature and the humidity;

processing, with the microprocessor system of the environmental monitoring system, the collected environmental data, to obtain processed environmental data, the processed environmental data comprising one or more of:

the temperature of the air in the interior of the aircraft measured in degrees Fahrenheit;

the humidity of the air in the interior of the aircraft measured as a relative humidity as a percentage from 0 to 100; and a calculated dew point of the air in the interior of the aircraft calculated based on the temperature and the humidity;

comparing, with the microprocessor system, the processed environmental data to one or more predetermined values, to obtain environmental data results, the one or more predetermined values comprising one or more of:

a predetermined temperature range between 40 degrees Fahrenheit and 80 degrees Fahrenheit;

a predetermined humidity range of 60 percent humidity and below; and a calculated dew point threshold; and alerting, with the multicolor light feedback display assembly, based on the environmental data results, one or more light emitting diode (LED) color signal lights corresponding to one or more of, one or more in-specification environmental parameters of the interior of the aircraft, and one or more out-of-specification environmental parameters of the interior of the aircraft, wherein the one or more light emitting diode (LED) color signal lights comprise one or more of:

a green color to indicate the one or more in-specification environmental parameters; and a red color, a blue color, a yellow color, and a purple color, each indicating one of the one or more out-of-specification environmental parameters.

10. The environmental monitoring method of claim 9, wherein the step of providing the environmental monitoring system further comprises, providing the environmental monitoring system comprising the multicolor light feedback display assembly further comprising:

mounting the multicolor light feedback display assembly to a mounting ring on a nosewheel anchor block positioned in front of a nose of the aircraft.

11. The environmental monitoring method of claim 9, wherein the step of providing the environmental monitoring system further comprises, providing the one or more light emitting diode (LED) color signal lights comprising:

the blue color to indicate the one of the one or more out-of-specification environmental parameters comprising the temperature outside the predetermined temperature range, where the temperature is below 40 degrees Fahrenheit;

the red color to indicate the one of the one or more out-of-specification environmental parameters comprising the temperature outside the predetermined temperature range, where the temperature is above 80 degrees Fahrenheit;

the yellow color to indicate the one of the one or more out-of-specification environmental parameters comprising the humidity outside the predetermined humidity range, where the humidity is above 60 percent humidity; and the purple color to indicate the one of the one or more out-of-specification environmental parameters comprising the dew point outside the calculated dew point threshold.

12. The environmental monitoring method of claim 9, wherein the step of providing the environmental monitoring system further comprises, providing the environmental monitoring system comprising one or more of:

a global positioning system (GPS), to provide a global positioning system (GPS) location of the aircraft;

a motion detector device, to sense a motion of the aircraft;

an interface for a collective network of connected devices that facilitates communication between the connected devices, to provide remote monitoring on a remote device;

a wireless network, to allow the environmental data to be collected remotely; and a short-range wireless technology, to exchange the environmental data results between fixed devices and mobile devices.

13. The environmental monitoring method of claim 9, wherein the step of providing the environmental monitoring system further comprises, providing the environmental monitoring system in the interior of the aircraft, and alerting, to a mobile device outside of the aircraft, one or more of the one or more out-of-specification environmental parameters.

14. The environmental monitoring method of claim 9, wherein the step of providing the environmental monitoring system further comprises, enclosing the one or more sensors of the environmental monitoring system in a sensor enclosure, and securing the one or more sensors in the sensor enclosure to the interior of the aircraft, via one or more securing elements.

15. An environmental monitoring system for real time monitoring of one or more environmental parameters in an interior of a structure comprising an aircraft, or a rotorcraft, the structure being on ground, the environmental monitoring system comprising:

one or more sensors positioned in the interior of the structure, the one or more sensors comprising one or more of:

a temperature sensor for measuring a temperature of air in the interior of the structure, the structure comprising the aircraft, or the rotorcraft, the structure being on the ground;

a humidity sensor for measuring a humidity of the air in the interior of the structure; and a combined temperature-humidity sensor for measuring the temperature and the humidity of the air in the interior of the structure, the one or more sensors configured to transfer from the one or more sensors to a microprocessor system, signals of environmental data relating to the one or more environmental parameters of the interior of the structure on the ground, to obtain collected environmental data, the one or more environmental parameters comprising one or more of:

the temperature of the air in the interior of the structure;

the humidity of the air in the interior of the structure; and a dew point of the air in the interior of the structure;

the microprocessor system connected to the one or more sensors, the microprocessor system comprising at least a circuit board with external circuitry, a microcontroller chip, and a processor, the microprocessor system configured to process the collected environmental data, to obtain processed environmental data, the processed environmental data comprising one or more of:

the temperature of the air in the interior of the structure measured in degrees Fahrenheit;

the humidity of the air in the interior of the structure measured as a relative humidity as a percentage from 0 to 100; and a calculated dew point of the air in the interior of the structure calculated based on the temperature and the humidity, and the microprocessor system configured to compare the processed environmental data to one or more predetermined values, to obtain environmental data results, the one or more predetermined values comprising one or more of:

a predetermined temperature range between 40 degrees Fahrenheit and 80 degrees Fahrenheit;

a predetermined humidity range of 60 percent humidity and below; and a calculated dew point threshold;

a power supply coupled to the microprocessor system; and a visual feedback display assembly coupled to the microprocessor system, the visual feedback display assembly configured to provide an alert signal, based on the environmental data results, using one or more light emitting diode (LED) color signal lights corresponding to one or more of, one or more in-specification environmental parameters of the interior of the structure, and one or more out-of-specification environmental parameters of the interior of the structure, wherein the one or more light emitting diode (LED) color signal lights comprise one or more of:

a green color to indicate the one or more in-specification environmental parameters; and a red color, a blue color, a yellow color, and a purple color, each indicating one of the one or more out-of-specification environmental parameters.

16. The environmental monitoring system of claim 15, further comprising one or more of:

a global positioning system (GPS), to provide a global positioning system (GPS) location of the structure;

a motion detector device, to sense a motion of the structure;

an interface for a collective network of connected devices that facilitates communication between the connected devices, to provide remote monitoring on a remote device;

a wireless network, to allow the environmental data to be collected remotely; and a short-range wireless technology, to exchange the environmental data results between fixed devices and mobile devices.

17. The environmental monitoring system of claim 15, wherein the visual feedback display assembly comprises a multicolor light feedback display assembly mounted exterior to the structure, the multicolor light feedback display assembly having a plurality of light emitting diode (LED) color signal lights housed within a domed housing apparatus.

18. The environmental monitoring system of claim 17, wherein the plurality of light emitting diode (LED) color signal lights comprise:

the blue color to indicate the one of the one or more out-of-specification environmental parameters comprising the temperature outside the predetermined temperature range, where the temperature is below 40 degrees Fahrenheit;

the red color to indicate the one of the one or more out-of-specification environmental parameters comprising the temperature outside the predetermined temperature range, where the temperature is above 80 degrees Fahrenheit;

the yellow color to indicate the one of the one or more out-of-specification environmental parameters comprising the humidity outside the predetermined humidity range, where the humidity is above 60 percent humidity; and the purple color to indicate the one of the one or more out-of-specification environmental parameters comprising the dew point outside the calculated dew point threshold.

19. The environmental monitoring system of claim 15, wherein the one or more sensors are enclosed in a sensor enclosure, and the sensor enclosure is attached to a surface within the interior of the structure.

20. The environmental monitoring system of claim 15, wherein the structure comprises the aircraft, and the visual feedback display assembly is mounted to a mounting ring on a nosewheel anchor block positioned in front of a nose of the aircraft.

* * * * *